(12) United States Patent
Hensley

(10) Patent No.: US 7,364,180 B2
(45) Date of Patent: Apr. 29, 2008

(54) TRAILER HITCH WITH SEPARATED FUNCTIONS

(75) Inventor: James C. Hensley, Centralia, IL (US)

(73) Assignee: James C. Hensley Revocable Living Trust A, Centralia, IL (US)

(*) Notice: Subject to any disclaimer, the term of this patent is extended or adjusted under 35 U.S.C. 154(b) by 122 days.

(21) Appl. No.: 11/024,572

(22) Filed: Dec. 29, 2004

(65) Prior Publication Data

US 2006/0138745 A1    Jun. 29, 2006

Related U.S. Application Data

(63) Continuation-in-part of application No. 10/779,398, filed on Feb. 13, 2004, now Pat. No. 6,851,696.

(51) Int. Cl.
*B60D 1/06* (2006.01)

(52) U.S. Cl. ............... 280/455.1; 280/456.1; 280/260.1; 280/491.5

(58) Field of Classification Search ............ 280/455.1, 280/456.1, 492, 457, 459, 491.5, 511, 460.1
See application file for complete search history.

(56) References Cited

U.S. PATENT DOCUMENTS

| | | | |
|---|---|---|---|
| 2,133,065 A | 10/1938 | Weber | |
| 2,704,218 A | 3/1955 | Claud-Mantle | |
| 2,871,029 A | 1/1959 | Demarest | |
| 2,940,776 A | 6/1960 | Curtis | |
| 3,057,644 A | 10/1962 | Fisher | |
| 3,279,819 A | 10/1966 | Edmonds | |
| 3,393,923 A | 7/1968 | Rendessy | |
| 3,520,556 A | 7/1970 | Warner | |
| 3,602,529 A | 8/1971 | Derr, Jr. | |
| 3,690,699 A | 9/1972 | Derr, Jr. | |
| 3,724,913 A | 4/1973 | Levy | |
| 3,751,069 A | 8/1973 | Suckow | |
| 3,778,088 A | 12/1973 | Alexander | |
| 3,787,068 A | 1/1974 | Miller | |
| 3,861,717 A | 1/1975 | Knox | |
| 3,871,686 A | 3/1975 | Rendessy | |
| 3,891,237 A | 6/1975 | Allen | |
| 3,891,238 A | 6/1975 | Ehlert | |
| 3,909,075 A | 9/1975 | Pittet, Jr. et al. | |
| 3,948,544 A | 4/1976 | Presley et al. | |
| 3,964,767 A | 6/1976 | Williams | |
| 3,967,863 A | 7/1976 | Tomecek et al. | |
| 3,981,517 A | 9/1976 | Crochet, Sr. | |
| 4,077,234 A | 3/1978 | Crochet, Sr. | |
| 4,178,011 A | 12/1979 | Kirsch | |

(Continued)

FOREIGN PATENT DOCUMENTS

DE        2057388        11/1970

(Continued)

*Primary Examiner*—Anne Marie Boehler
(74) *Attorney, Agent, or Firm*—Polster, Lieder, Woodruff & Lucchesi, LC

(57) ABSTRACT

A hitch assembly for coupling a trailer to a tow vehicle includes a number of assemblies, including converging links and a slide assembly, that effectively places the pivot point for the trailer ahead of the actual hitch assembly, which in turn enhances the stability of the combination tow vehicle and trailer, rendering it less susceptible to swaying or fishtailing.

10 Claims, 17 Drawing Sheets

U.S. PATENT DOCUMENTS

| | | | |
|---|---|---|---|
| 4,196,918 A | 4/1980 | Strader | |
| 4,198,073 A | 4/1980 | Olsen | |
| 4,213,627 A | 7/1980 | Thompson | |
| 4,281,847 A | 8/1981 | Robe | |
| 4,312,516 A | 1/1982 | Olsen | |
| 4,398,252 A | 8/1983 | Frait | |
| 4,511,159 A | 4/1985 | Younger | |
| 4,515,387 A | 5/1985 | Schuck | |
| 4,560,184 A | 12/1985 | Williams, Jr. | |
| 4,572,030 A | 2/1986 | Sakurai et al. | |
| 4,582,337 A | 4/1986 | Hseuh | |
| 4,606,549 A | 8/1986 | Williams, Jr. | |
| 4,613,149 A | 9/1986 | Williams, Jr. | |
| 4,721,344 A | 1/1988 | Frait et al. | |
| 4,722,542 A | 2/1988 | Hensley | |
| 4,726,627 A | 2/1988 | Frait et al. | |
| 4,802,562 A | 2/1989 | Kuroyanagi et al. | |
| 4,804,237 A | 2/1989 | Gee et al. | |
| 4,811,967 A | 3/1989 | Hensley | |
| 4,888,997 A | 12/1989 | Eckert et al. | |
| 4,978,177 A | 12/1990 | Ingraham et al. | |
| 5,010,972 A | 4/1991 | Ingraham et al. | |
| 5,217,280 A | 6/1993 | Nykerk et al. | |
| 5,222,754 A | 6/1993 | Few | |
| 5,251,966 A | 10/1993 | Friederichs et al. | |
| 5,273,347 A | 12/1993 | Hansson | |
| 5,306,037 A | 4/1994 | Robertson | |
| 5,427,440 A | 6/1995 | Ward et al. | |
| 5,438,516 A | 8/1995 | Neubauer et al. | |
| 5,443,306 A | 8/1995 | Broome | |
| 5,615,930 A | 4/1997 | McGrath et al. | |
| 5,620,236 A | 4/1997 | McGrath et al. | |
| 5,660,409 A | 8/1997 | Hensley | |
| 5,707,071 A | 1/1998 | Prestidge et al. | |
| 6,485,046 B1 | 11/2002 | Hsueh et al. | |
| 6,739,601 B1 * | 5/2004 | Fine | 280/3 |
| 2001/0033068 A1 | 10/2001 | Melesko et al. | |
| 2002/0190498 A1 | 12/2002 | Schmidt et al. | |

FOREIGN PATENT DOCUMENTS

| | | |
|---|---|---|
| DE | 3301460 | 7/1984 |
| FR | 2696130 | 4/1994 |
| WO | 9408804 | 4/1994 |

* cited by examiner

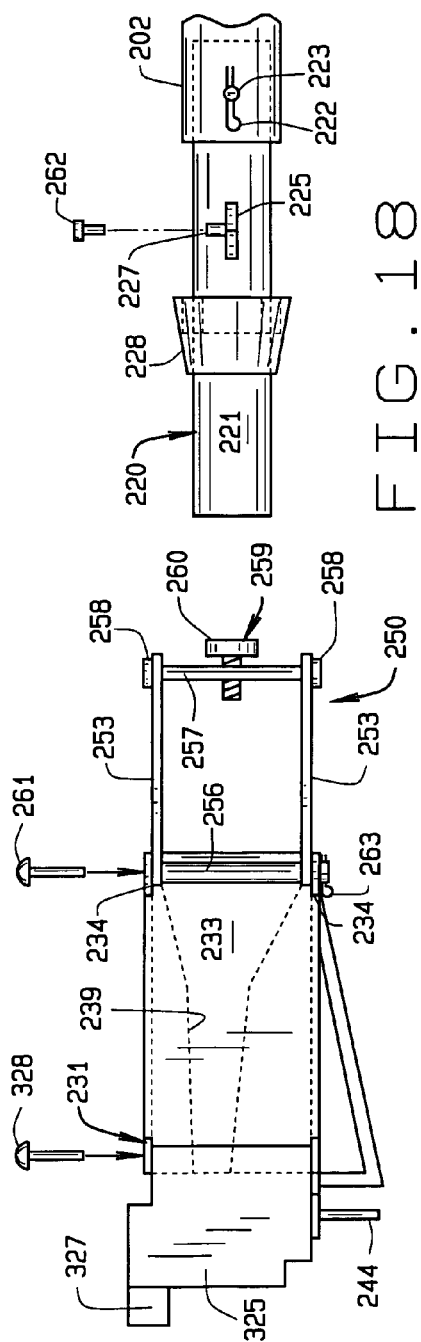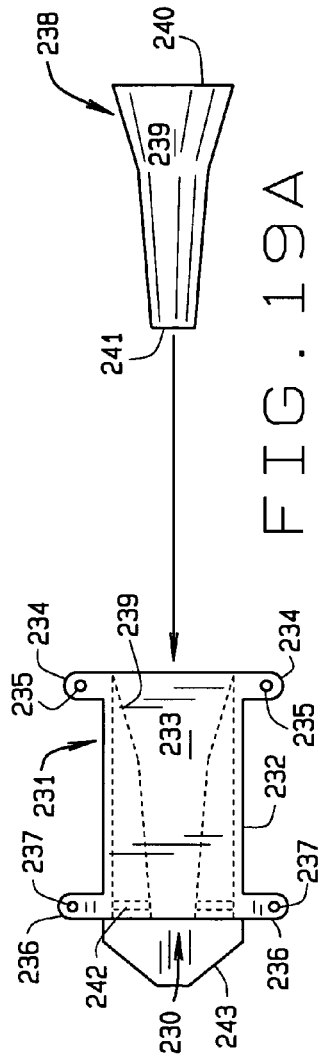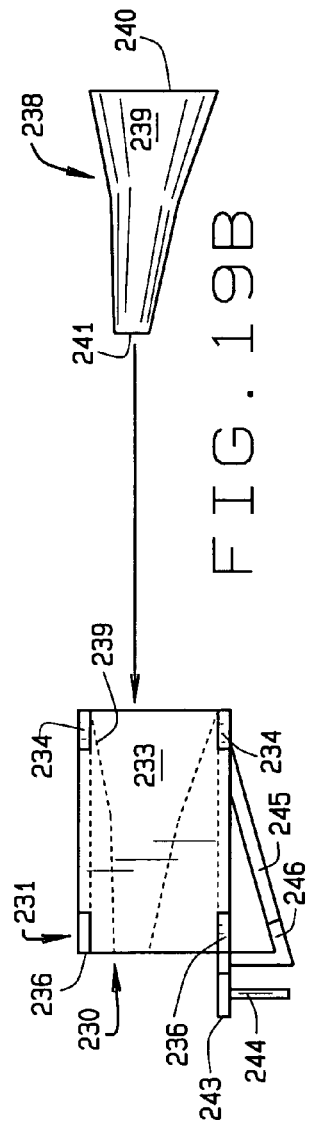

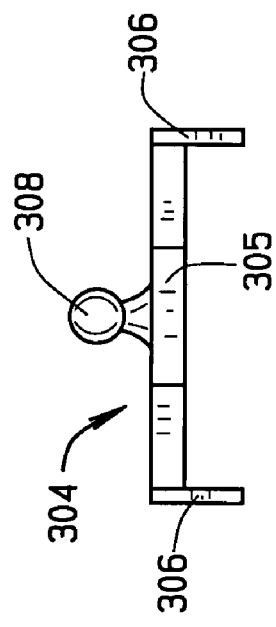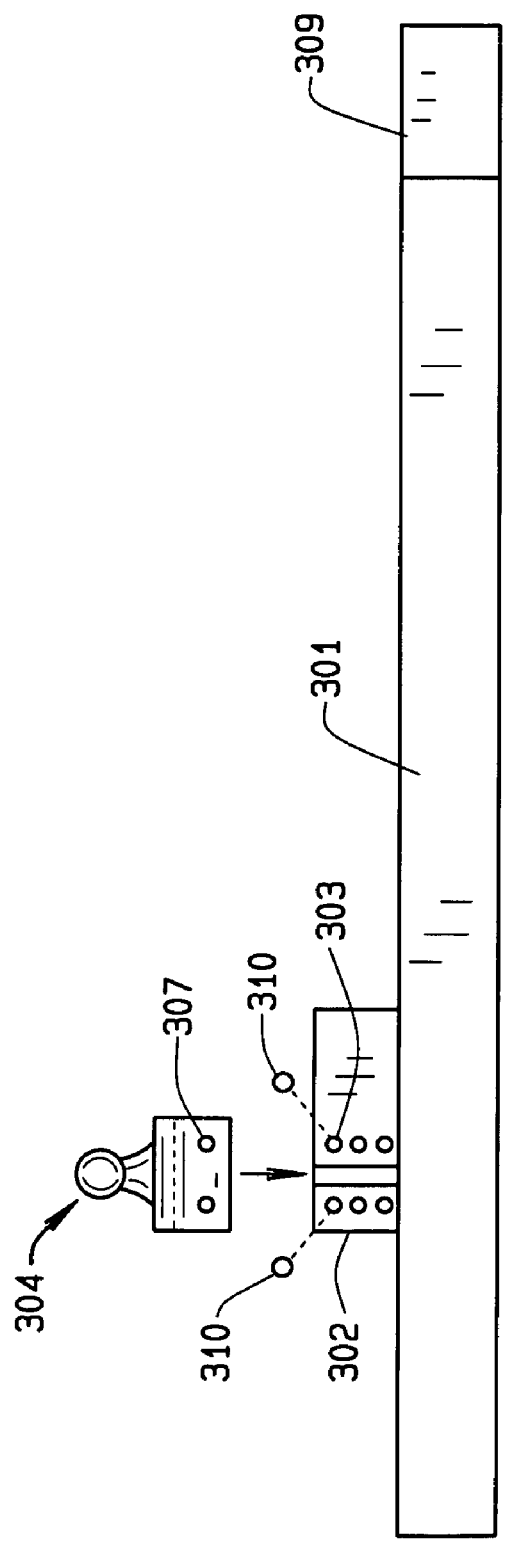

TRAILER HITCH WITH SEPARATED FUNCTIONS

CROSS-REFERENCE TO RELATED APPLICATIONS

This application is a continuation-in-part claiming priority to U.S. patent application Ser. No. 10/779,398 filed Feb. 13, 2004, now U.S. Pat. No. 6,851,696, hereby incorporated by reference.

STATEMENT REGARDING FEDERALLY SPONSORED RESEARCH

Not Applicable.

BACKGROUND OF THE INVENTION

The first trailer hitches only consisted of a clevis and a pin, and later a ball mounted on the framework of a tow vehicle or a ball mount inserted into a receiver type hitch. These types of trailer hitches allowed for movement in all directions between the tow vehicle and the trailer. However, all that movement can negatively affect steering, braking, control, and overall vehicle performance. In addition, the increase in gross trailer weights over the years created the need for trailers that can handle different size weights, both large and small.

To accommodate different gross trailer weights, trailer hitches for light vehicles and trailers, such as autos, vans, SUV's, and pickup trucks, are generally one of four ratings, divided into Classes I-IV. For the purposes of this patent application, gross trailer weight is defined as the weight of the trailer when it is fully loaded. Ordinarily, hitches are rated for 10% of gross trailer weight to be on the tongue, referred to as the tongue weight. For the purposes of this patent application, tongue weight is defined as the weight put on a hitch ball by a trailer coupler.

A Class I hitch comprises a framework attached to a tow vehicle including a ball mount and ball for attaching a trailer coupler. This Class is generally rated at 2,000 lb. gross trailer weight. In addition, the ball mount can be either fixed or removable.

A Class II hitch is similar to Class I, except that the rating is generally 3,500 lb. Like Class I, Class II can have either a fixed or removable ball mount.

A Class III hitch only uses a removable ball mount. This style of hitch is known as a "hitch receiver". In addition to ball mounts, a hitch receiver can be used with other more complicated types of mounts.

A Class IV hitch is similar to Class II, except it is heavier duty. This Class may be rated as high as 14,000 lbs. gross trailer weight.

To handle heavy trailer loads, a weight distribution hitch was invented. As trailer loads increase, tongue weight also increases. When tongue weight increases too much, it pushes down the rear of the tow vehicle causing numerous problems. To counteract this problem, the weight distribution hitch uses spring bars attached to a ball mount and a trailer frame to distribute the tongue weight among all the tow vehicle wheels and all the trailer wheels. As a result, the tow vehicle remains nearer to level from front to back while the trailer is attached. While this type of hitch is a big improvement over previous systems, it does very little to solve the problem of side-to-side movement of the trailer or sway, commonly called fishtail sway.

Fishtail sway is caused by the large distance between the rear axle of the tow vehicle and the hitch assembly and is aggravated by lateral forces against the vehicle caused by winds or passing vehicles. Previous attempts to solve fishtail sway involve stiffening the connection between tow vehicle and trailer by using various methods of friction. While these methods help some, none completely correct the problem.

Fortunately, in U.S. Pat. No. 4,722,542, hereafter referred to as the "Hensley hitch", the sway problem is effectively corrected by forcing the hitch to turn through converging links that effectively move the pivot point between the tow vehicle and trailer to a point near the rear axle of the tow vehicle. Therefore, this design provides better steering and control of the trailer by eliminating trailer sway. While the converging links do this very well, the gross trailer weight is limited by the size and design of the converging links in '542 because so much of the tongue weight is supported by the converging links. As a result, increasingly heavier tongue weights require larger links, larger bearings, larger spindles, and larger related support systems. Increasing the size of these parts also increases both the hitch weight and the cost of manufacturing. In addition, the Hensley hitch needs workable brakes on the trailer controlled from the tow vehicle. Without trailer brakes or even with surge brakes the converging links tend to move to one side or the other due to the trailer pushing on the hitch assembly when the tow vehicle-brakes are applied.

U.S. Pat. No. 5,660,409, hereafter referred to as the "Hensley mini-hitch", does not need workable brakes on the trailer controlled from the tow vehicle. However, the Hensley mini-hitch is still limited to use on lighter trailers with relatively light tongue weight, because the tongue weight is supported by the on a sliding ball mount. In this design, a strut holds the trailer at a constant distance from the tow vehicle while stopping. In addition, a ball mounted on a sliding mount holds the trailer at a constant distance from the tow vehicle during turns. Still, this design requires maintaining this sliding mechanism as near a zero clearance as possible. To maintain this narrow clearance, fine-tuning and maintenance is required on the sliding mount. Nonetheless, this design is not practical for use with extremely heavy tongue weight.

Therefore, it would be advantageous to have a trailer hitch that can handle heavy tongue weights without increasing the size of converging links and associated support systems.

DESCRIPTION OF THE DRAWINGS

In the accompanying drawings which form part of the specification:

FIG. 18 is a side view of the second embodiment of the hitch bar and the hitch box assembly.

FIG. 19A is a top view of the second embodiment of the hitch box assembly.

FIG. 19B is a side view of the second embodiment of the hitch box assembly.

FIG. 20A is a front view of a second embodiment of a ball plate assembly.

FIG. 20B is a side view of a second embodiment of a ball mount assembly.

Corresponding reference numerals indicate corresponding parts throughout the several figures of the drawings.

DETAILED DESCRIPTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

First Embodiment of the Present Invention

Figure 1:
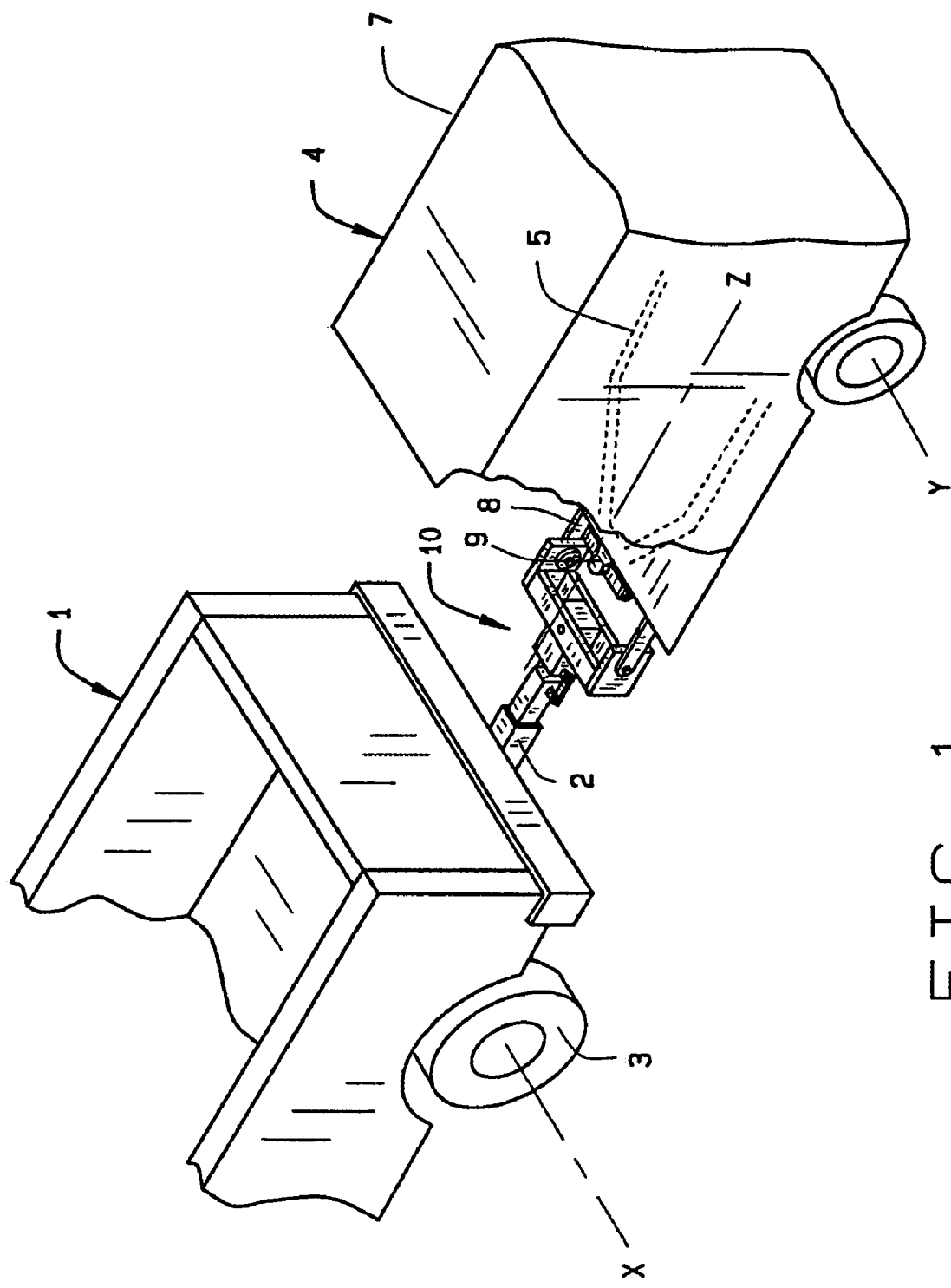
FIG. 1 is a perspective view of a first embodiment of a trailer connected to a tow vehicle with a hitch assembly.

As shown in the first embodiment of the present invention as shown in FIGS. 1-12, a tow vehicle 1 is coupled to a trailer 4 with a hitch assembly 10 (FIG. 1). It will be appreciated by those skilled in the art that the tow vehicle 1 can be any conventional automobile, a van, or truck such as the pickup shown in FIG. 1. Further, as used in the specification and the claims, the term trailer is intended to include any type of towable device or vehicle that can be pulled behind or trails a tow vehicle. The tow vehicle 1 includes rear wheels 3 which revolve about an axis X. The tow vehicle 1 includes a conventional hitch receiver 2, which is appropriately secured to the tow vehicle 1 in any conventional or accepted manner.

The trailer 4 has a frame 5 which is supported on wheels 6 that revolve about a common axis Y, and the frame 5 in turn supports a trailer body 7. The front of the frame 5 forms a so-called tongue or A-frame, in that it has side members 8 which converge forwardly and are connected at their forward ends to a coupler 9 used to secure the trailer 4 to a hitch ball 108 of the hitch assembly 10. The coupler 9 is a generally spherical socket that opens downwardly and is sized to receive a conventional trailer hitch ball. The coupler 9 also has a conventional locking device which will close upon the hitch ball and retain it in the socket. The coupler 9 may also contain a conventional surge brake. Generally, a surge brake contains a master cylinder that is hydraulically connected through lines to brakes at the wheels of the trailer 4. A conventional surge brake is actuated when the tow vehicle slows or stops and the forward movement of the trailer 4 urges the master cylinder against the hitch ball, which in turn, causes hydraulic actuation of the brakes at the trailer wheels. The hitch assembly 10 of the present invention can accommodate trailers employing conventional surge brakes as well as trailers employing more exotic braking mechanisms. A typical trailer also includes safety chains and an electric plug.

The present invention has three separate functions: 1) pulling and stopping, 2) sway controlling, and 3) load bearing. In order to better illustrate the three separate functions of the invention, the remaining description is divided into three separate sections with each section concentrating on one of the three functions of the invention.

Pulling and Stopping

As shown in FIGS. 1-6, for pulling and stopping the trailer 4 the hitch assembly 10 comprises a hitch bar assembly 20, a hitch box assembly 30, an over-center latch assembly 50, a front support member 70, a strut assembly 90, and a ball mount assembly 100. Together, these assemblies connect the tow vehicle 1 to the trailer 4 for transferring the pulling and stopping forces of the tow vehicle 1 to the trailer 4. Notably, none of the pulling and stopping forces are transferred through converging links 140, which will be described below in greater detail.

Figure 2:
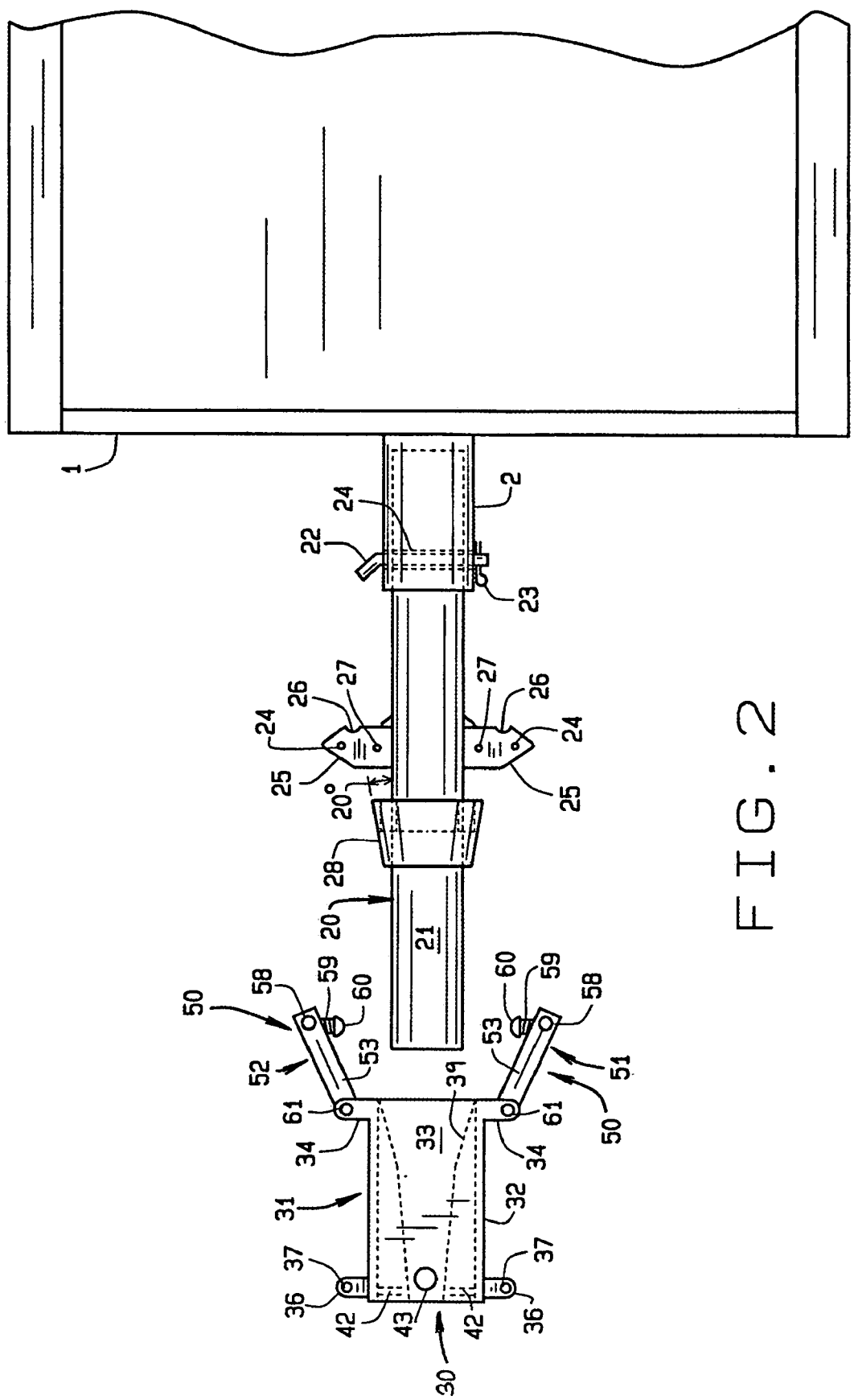
FIG. 2 is a top view of a first embodiment of a hitch bar and a hitch box assembly.
Figure 3:
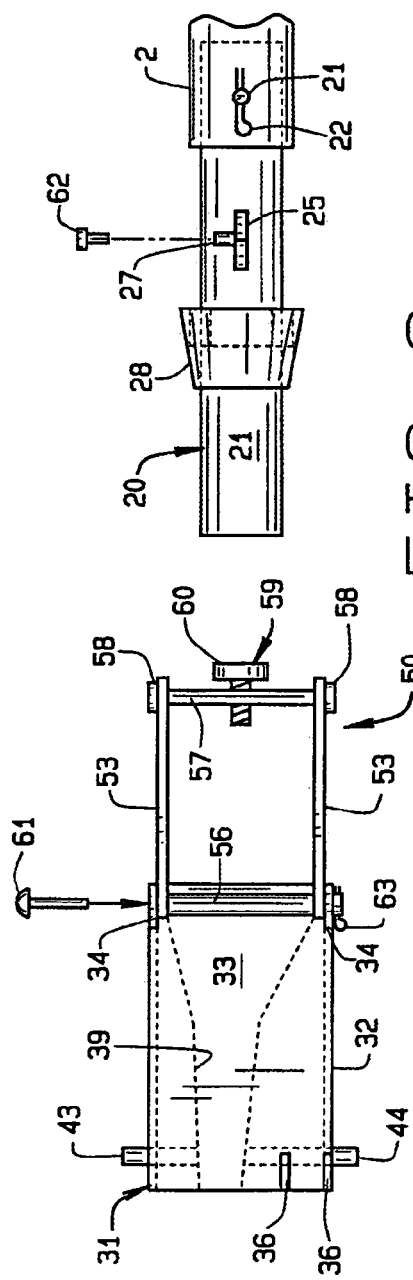
FIG. 3 is a side view of the first embodiment of the hitch bar and the hitch box assembly.

As shown in FIGS. 2 and 3, the hitch bar assembly 20 is a square bar 21 that inserts into the hitch receiver 2 and projects rearwardly in a generally horizontal orientation with its longitudinal axis along the centerline of the tow vehicle 1. The hitch bar assembly 20 fits snugly into the hitch receiver 2 with very little clearance and is secured by inserting a standard hitch pin 22 and clip 23 into corresponding through holes 24. The hitch bar assembly 20 includes over-center latch tabs 25 welded to each side of the bar 21 at the mid-section. The tabs 25 project laterally from the bar 21 and define through holes 24, concave recesses 26, and roll pins 27 for coupling with the over-center latch assembly 50 to be described below. The hitch bar assembly 20 also includes stops 28 welded to the rear of the tabs 25 on all four sides of the bar 21 for mating with the hitch box assembly 30 to be described below. The stops 28 are wedges with beveled faces facing rearwardly with an angle of about 20°.

Figure 4A:
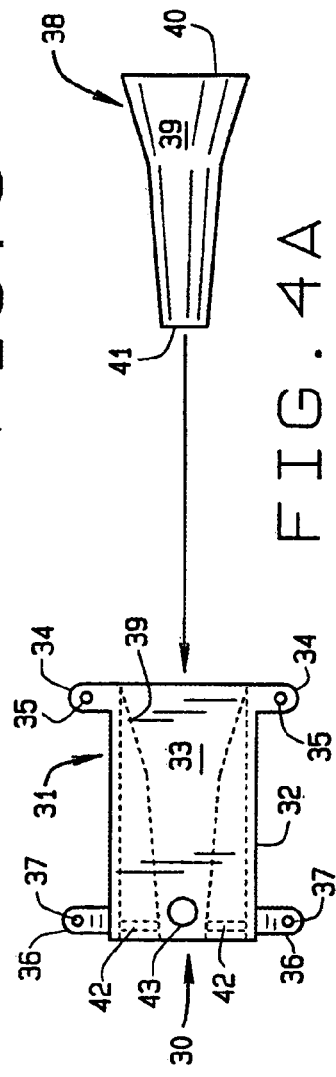
FIG. 4A is a top view of the first embodiment of the hitch box assembly.
Figure 4B:
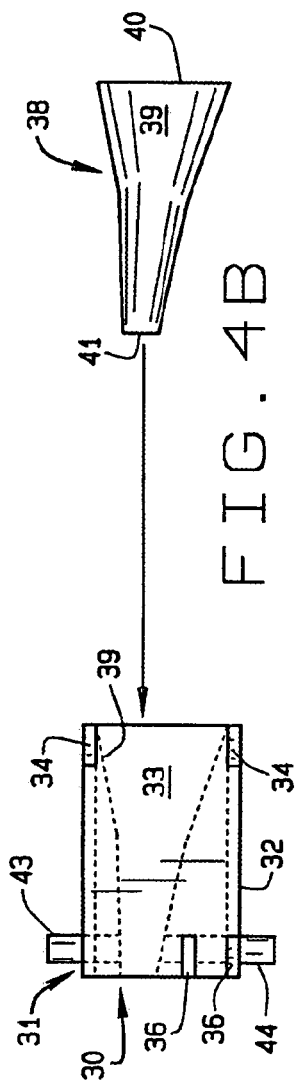
FIG. 4B is a side view of the first embodiment of the hitch box assembly.
Figure 5A:
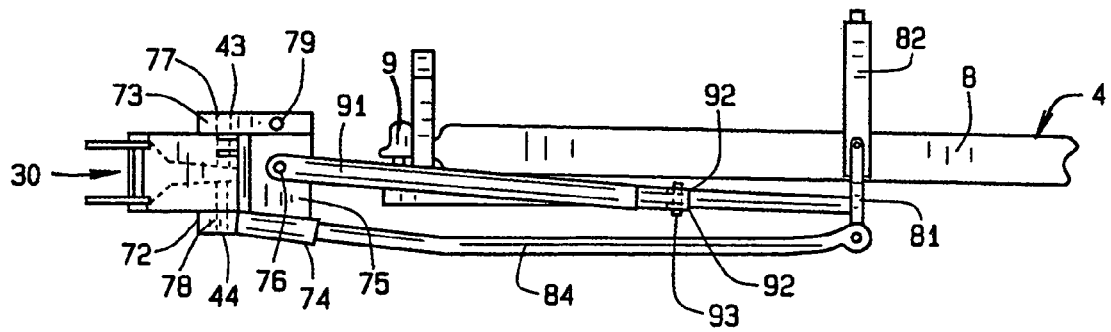
FIG. 5A is a partial side view of the first embodiment of the hitch assembly.
Figure 5B:
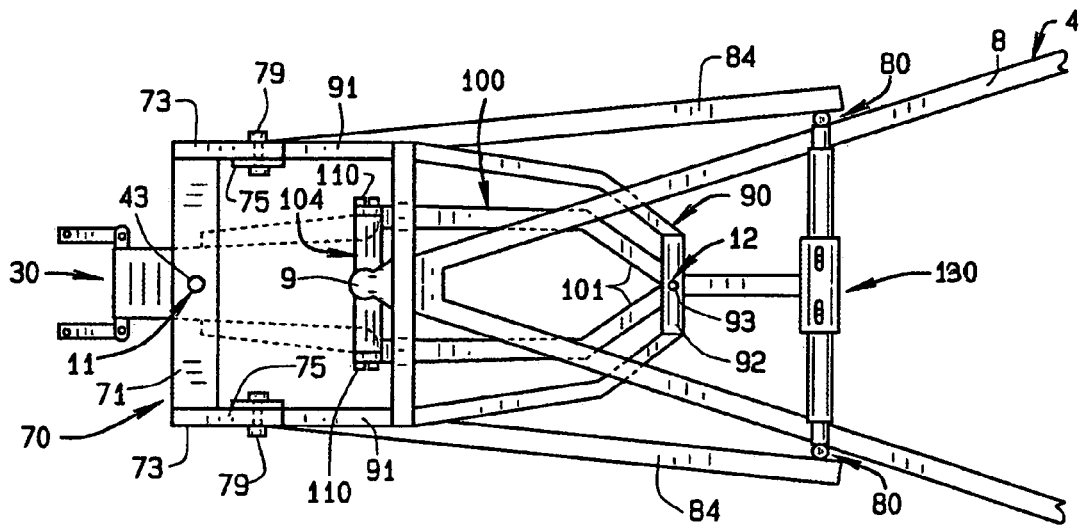
FIG. 5B is a partial top view of the first embodiment of the hitch assembly.

The hitch box assembly 30 is similar to the one disclosed in U.S. Pat. No. 4,811,967, hereby incorporated by reference, which mates with the hitch bar assembly 20. As shown in FIGS. 4A and 4B, the hitch box assembly 30 comprises an outer hitch box 31 and an inner hitch box 38. The outer hitch box 31 comprises four sidewalls 32 which are joined together to form a square box-like enclosure defining an opening 33 for receiving the inner box 38. To insure a tight fit, the inner dimensions of the outer hitch box 31 are sized to fit closely over the outer dimensions of the inner hitch box 38. The inner hitch box 38 comprises four angular walls 39 joined to form a funnel-shaped enclosure that narrows from a front end 40 to a back end 41 for receiving the hitch bar assembly 20. The interior dimensions of the angular walls 39 should provide enough clearance so the bar 21 of the hitch bar assembly 20 can extend to the rear of the hitch box 30 when inserted. In addition, the walls 39 are angled to match the beveled faces of the stops 28 of the hitch bar assembly 20 for proper seating.

The inner hitch box 38 is secured to the outer hitch box 31 by welding the front end 40 to the sidewalls 32 and welding two fillers 42 horizontally between the back end 41 and the sidewalls 32. The inner hitch box 38 is secured inside the outer hitch box 31 so the back end 41 is raised slightly higher than the front end 40 at approximately a five-degree angle. The back end 41 is raised higher to compensate for looseness and weakness in the hitch receiver 2 when spring bars 84 are tensioned. When the spring bars 84 are tensioned, the hitch receiver 2 may angle slightly downward. Therefore, the five-degree angle serves to keep the hitch box assembly 30 nearer to horizontally level.

The outer hitch box 31 also comprises four front tabs 34 for attaching the over-center latch assembly 50 and four back tabs 36 for attaching converging steering links 140, which are described below in the steering section. The front tabs 34 and back tabs 36 define respective through holes 35 and 37. The front tabs 34 are welded at the frontward sides of the outer hitch box 31 at the top and bottom projecting laterally so the through holes 35 align. The back tabs 36 are welded to the bottom rearward sides of the outer hitch box 31 projecting laterally so the through holes 37 align. The back tabs 36 should define a gap between themselves large enough to provide a narrow clearance for inserting the converging steering links 140.

As shown in FIGS. 2 and 3, the over-center latch assembly 50 is similar to the one disclosed in U.S. Pat. No. 4,811,967, which is used to secure the hitch box 30 to the hitch bar assembly 20. The over-center latch assembly 50 includes a left latch 51 and right latch 52 each comprising a pair of connecting links 53, a vertical tube 56, a pivot pin 57, a thrust link 59, a latch pin 61, and a safety pin 62. Each connecting link 53 is a straight bar defining front through holes and back through holes. The pair of connecting links 53 is connected in parallel by hingedly attaching the pivot pin 57 between the front holes and by fixedly attaching the hollow vertical tube 56 between the back holes. The pivot pin 57 defines a transversely directed threaded bore for receiving the thrust link 59 located midway between the two connecting links 53. The thrust link 59 is a threaded rod with a cross head 60 which inserts into the threaded bore of the pivot pin 57 so the surface of the cross head 60 is presented away from the pivot pin 57 for engaging the latch tabs 25 of the hitch bar assembly 20. The thrust link 59 can be screwed either in or out of the threaded bore to allow for any adjustment needed to ensure a tight fit with the latch tabs 25. To rotate the pivot pin 57 and thrust link 59 about a vertical axis, hexagonal heads 58 are attached to each end of the pivot pin 57. The hexagonal heads 58 can be engaged by a conventional end, socket or box wrench to rotate the pivot pin 57 and thrust link 59 to engage and disengage the hitch bar assembly 20. The left latch 51 and right latch 52 are attached to respective front tabs 34 of the hitch box 30 by inserting each latch 51 and 52 in between the top and bottom front tabs 34 so the vertical tubes 56 align with the through holes 35. To secure both latches 51 and 52, latch pins 61 are inserted through the front tabs 34 into the vertical tubes 56 so the latches 51 and 52 can rotate about a vertical axis. For additional security, the latch pins 61 are secured with cotter pins 63.

To secure the hitch bar assembly 20 to the hitch box assembly 30 the bar 21 of the hitch bar assembly 20 inserts into the hitch box assembly 30 until the stops 28 seat against the walls 39 of the inner hitch box 38. The latches 51 and 52 pivot from a slightly outward direction to a slightly inward position, referred to as the over-center position so the connecting links 53 rest against the roll pins 27 of the latch tabs 25. A conventional end, socket or box wrench engages the hexagonal heads 58 of the pivot pins 57 and rotates the pivot pins 57 and thrust links 59 so the cross heads 60 engage the recesses 26 of the latch tabs 25, also referred to as the over-center position. In this position, the hitch box assembly 30 is prevented from moving laterally or vertically with respect to the hitch bar assembly 20. The over-center latch assembly 50 prevents the hitch box assembly 30 from pulling away from the hitch bar assembly 20. For extra safety, the safety pins 62 are inserted into the through holes 24 of the latch tabs 25. The safety pins 62 prevent the latches 51 and 52 from moving outwardly away from the over-center position. Before anyone attempts to swing either latch 51 or 52 outwardly in order to disconnect the hitch box assembly 30, the safety pins 62 must be removed.

The hitch box assembly 30 also includes an upper king pin 43 and a lower king pin 44 for pivotally connecting to the front support member 70 at a first pivot point 11. The upper king pin 43 inserts into a through hole at the top rear of the outer hitch box 31 and fixedly attaches to the inner hitch box 38 so the upper king pin 43 protrudes upwardly out of the hitch box assembly 30. The lower king pin 44 inserts into a through hole at the bottom rear of the outer hitch box 31 and fixedly attaches to the inner hitch box 38 so the lower king pin 44 protrudes downwardly out of the hitch box assembly 30 and is vertically aligned with the upper king pin 43.

As shown in FIGS. 5A, 5B, 6A, and 6B, the front support member 70 comprises an upper crossbar 71, a lower crossbar 72, side caps 73, spring bar tubes 74, and side support plates 75. Both the upper crossbar 71 and lower crossbar 72 are straight rectangular tubes defining respective vertical through holes 77 and 78 and at the midsection of each tube for pivotally connecting to respective upper king pin 43 and lower king pin 44 at the first pivot point 11. The spring bar tubes 74 are straight square tubes that weld to each end of the lower crossbar 72 so they extend rearwardly and horizontally for receiving the spring bars 84. In addition, the spring bar tubes 74 should extend at an outward angle. When the spring bars 84 are inserted into the spring bar tubes 74, the outward angle allows the spring bars 84 to pivotally attach to the trailer frame 5 via the jack assembly 80 to be described below. The side support plates 75 are rectangular plates defining through holes at a top end for bolting to the side caps 73. The side support plates 75 are welded to the top edges of the spring bar tubes 74 so the plates 75 extend rearwardly and vertically, thus joining the side support plates 75 to the lower crossbar 72. The side caps 73 are flat plates welded to each end of the upper crossbar 71 extending rearwardly and horizontally and define through holes for connecting to the side support plates 75. The side support plates 75 also include strut pins 76 which protrude outwardly and horizontally for connecting to the strut assembly 90 to be described below. The strut pins 76 are located so they are near alignment with the center of converging steering links 140 when the hitch assembly 10 is completely assembled.

To attach the front support member 70 to the hitch box assembly 30, the lower crossbar 72 is pivotally attached to the lower king pin 44 by inserting the lower kingpin 44 into the through hole 78. The upper crossbar 71 is pivotally attached to the upper king pin 43 by inserting the upper king pin into the through hole 77. Using bolts 79, the side support plates 75 are fixedly attached to the side caps 73. When assembled, the front support member 70 provides a stable pivoting connection between the hitch box assembly 30 and the strut assembly 90 at the first pivot point 11.

The strut assembly 90 is an arch-shaped frame that connects the front support member 70 to the ball mount assembly 100 at a second pivot point 12 for transferring pulling and stopping forces. The strut assembly 90 also supports the hanging support assembly 150 to be described below in greater detail. The strut assembly 90 comprises two side tubes 91 and two rear caps 92. The side tubes 91 are arched tubes with front ends that pivotally connect to the strut pins 76 of the front support member 70 so the tubes 91 can pivot vertically but are rigid laterally. Vertical pivoting of the strut assembly 90 through the tubes 91 accommodates uneven roads or drives in which the front of the tow vehicle 1 would be higher or lower than the rear of the tow vehicle 1. The side tubes 91 extend rearwardly and horizontally so both tubes 91 arch inwardly. The rear caps 92 are rectangular plates welded laterally between the tops and bottoms at the rear ends of the side tubes 91 to complete the arch-shaped frame. The rear caps 92 include a ball mount pin 93 vertically connecting the midsections of each cap 92 for pivotally connecting to the ball mount assembly 100. When assembled, the strut assembly 90 extends rearwardly beneath the trailer frame 5 and pivotally attaches to the rear of the ball mount assembly 100 at the second pivot point 12.

The ball mount assembly 100 is a frame with a rectangular front end and a V-shaped rear end that connects the strut assembly 90 to the trailer 4 for transferring pulling and stopping forces. The ball mount assembly 100 comprises side channels 101, vertical supports 102, a ball plate assembly 104, and a tail tube 109. The two side channels 101 are C-shaped channels that extend rearwardly and horizontally parallel with each open-channel side facing inward. The rear ends of the channels 101 angle inward and are welded together forming a V-shape that mirrors the arch-shape of the strut assembly 90. The vertical supports 102 are rectangular plates defining a plurality of through holes 103 for attaching the ball plate assembly 104 at multiple heights. The vertical supports 102 are welded vertically to the top front ends of the channels 101.

Figure 6A:
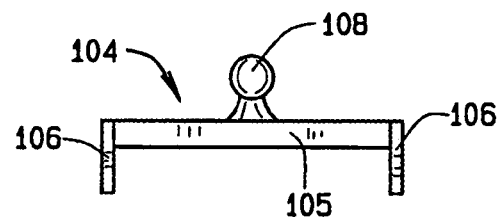
FIG. 6A is a front view of a first embodiment of a ball plate assembly.
Figure 6B:
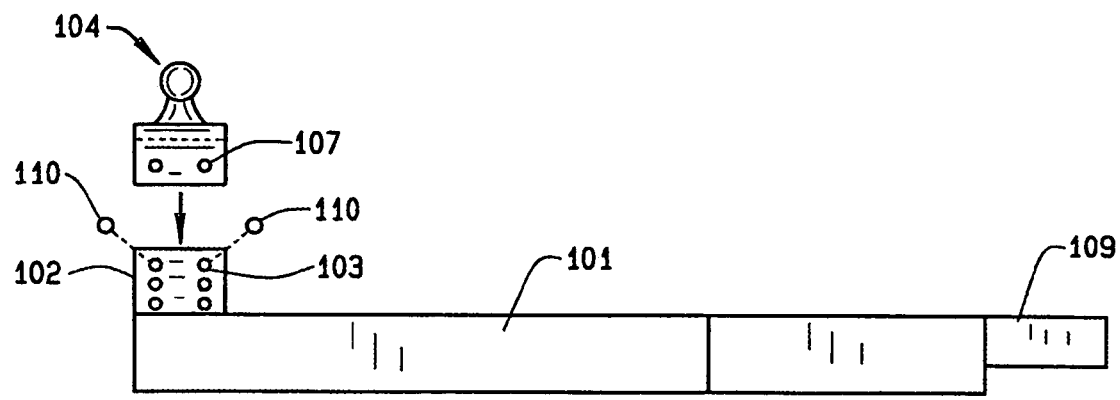
FIG. 6B is a side view of a first embodiment of a ball mount assembly.

As shown in FIGS. 6A and 6B, the ball plate assembly 104 is a horizontal crossbar 105 with side supports 106 welded to each end of the crossbar 105 extending downward and a hitch ball 108 mounted to the top center of the crossbar 105. The side supports 106 define through holes 107 for attaching to the vertical supports 102. The tail tube 109 is a straight tube welded to the rear end of the channels 101 so the tail tube 109 extends rearwardly and horizontally for engaging a tail support assembly to be described below in greater detail.

To assemble, the ball plate assembly 104 is bolted to the vertical supports 102 at an appropriate height by aligning holes 107 of the ball plate assembly 104 with the appropriate holes 103 of the vertical support 102 and inserting bolts 110. The entire ball mount assembly 100 is pivotally attached to the ball mount pin 93 of the strut assembly 90 by inserting the ball mount pin 93 through a hole at the intersection of the side channels 101. This pivoting connection allows the ball mount assembly 100 to pivot laterally within the strut assembly 90. In addition, the tail tube 109 couples with the tail support assembly 130 to be described below in greater detail in the steering section. To complete the assembly, the trailer 4 attaches to the ball mount assembly 100 by coupling the hitch ball 108 with the coupler 9. Ordinarily, the typical ball-and-socket trailer hitch accommodates universal movement, but in the present invention, the trailer 4 is prevented from turning relative to the hitch ball 108 by the ball mount assembly 100 and the tail support assembly 130. Instead, this movement is accommodated by the converging links 140 and the slide assembly 120 described below in the steering section. However, the trailer 4 is free to rock from side-to-side on the hitch ball 108 in reference to the tow vehicle 1 and the rear of the ball mount assembly 100 where the tail tube 109 slides into the tail support assembly 130.

In operation, the pulling and stopping forces are transferred from the tow vehicle 1 through the hitch receiver 2 to the hitch bar assembly 20, from the hitch bar assembly 20 to the hitch box assembly 30, from the hitch box assembly 30 to the front support member 70, from the front support member 70 to the strut assembly 90, from the strut assembly 90 to the ball mount assembly 100, and finally, from the ball mount assembly 100 to the trailer 4. As mentioned above, none of the pulling and stopping forces are transferred through the converging links 140.

Sway Controlling

Figure 7A:
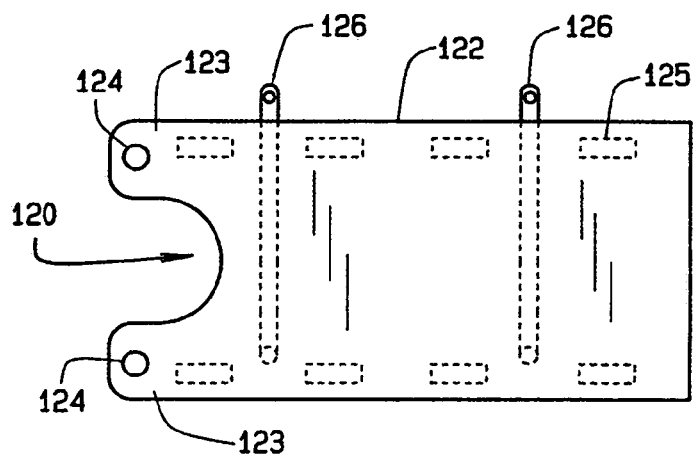
FIG. 7A is a partial top view of a first embodiment of a sliding assembly.
Figure 7B:
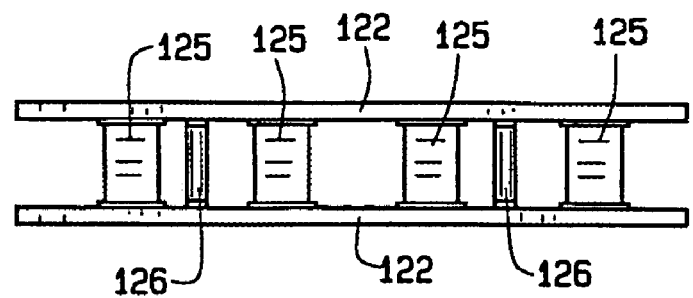
FIG. 7B is a partial side view of the first embodiment of the sliding assembly.
Figure 7C:
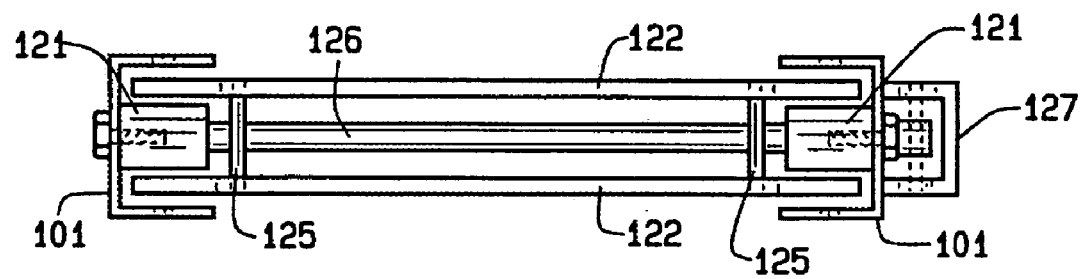
FIG. 7C is a partial end view of the first embodiment of the sliding assembly.
Figure 11:
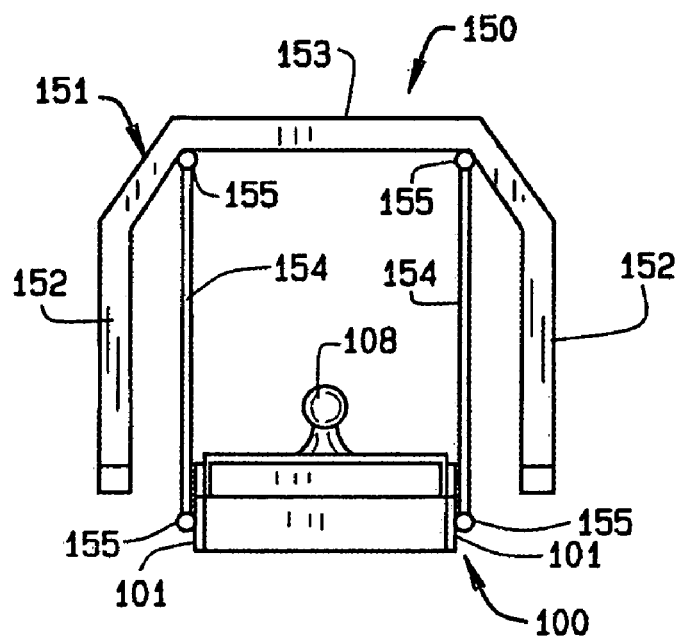
FIG. 11 is a partial end view of a hanging support assembly.
Figure 8A:
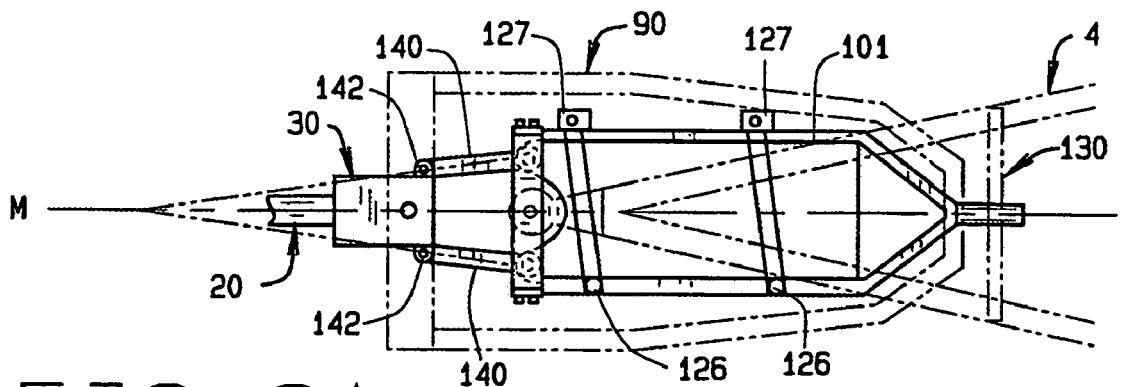
FIG. 8A is a partial top view of the first embodiment of the hitch assembly during straight travel.
Figure 8B:
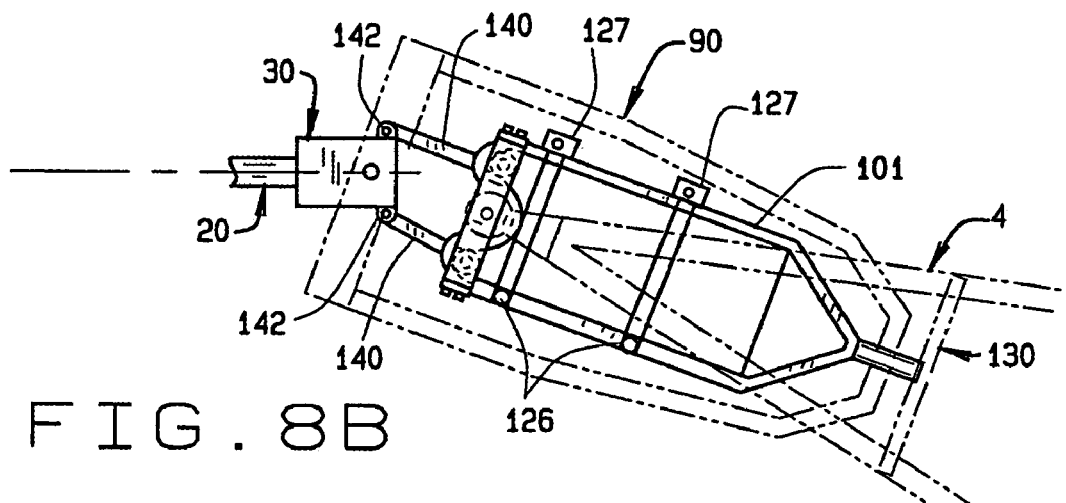
FIG. 8B is a partial top view of the first embodiment of the hitch assembly during a slight turn.
Figure 8C:
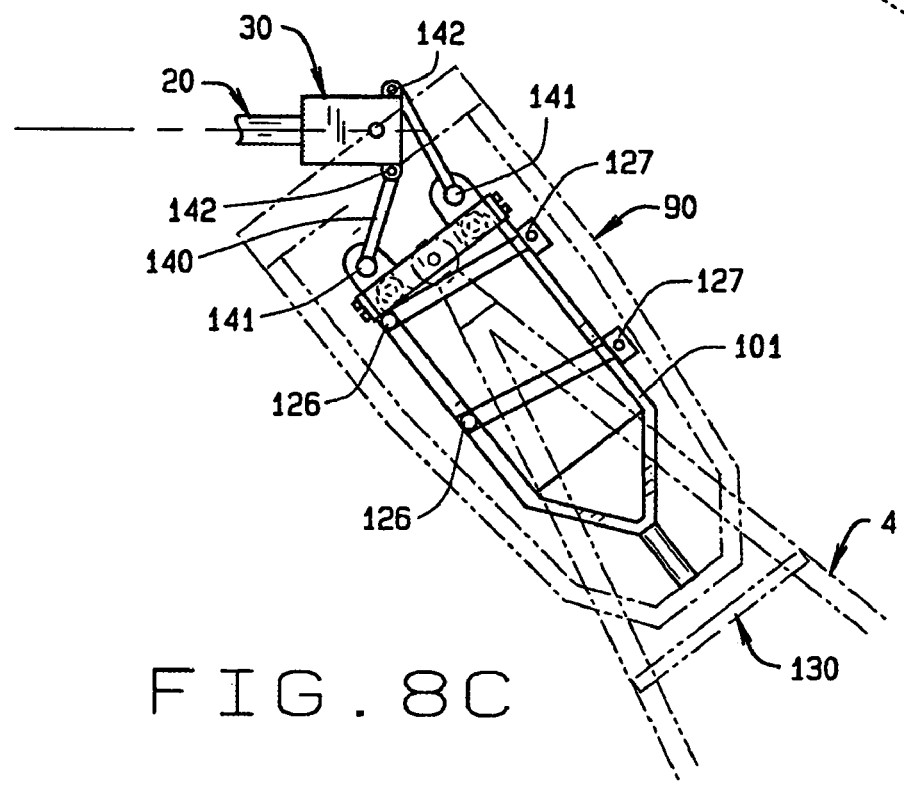
FIG. 8C is a partial top view of the first embodiment of the hitch assembly during a sharp turn.
Figure 9:
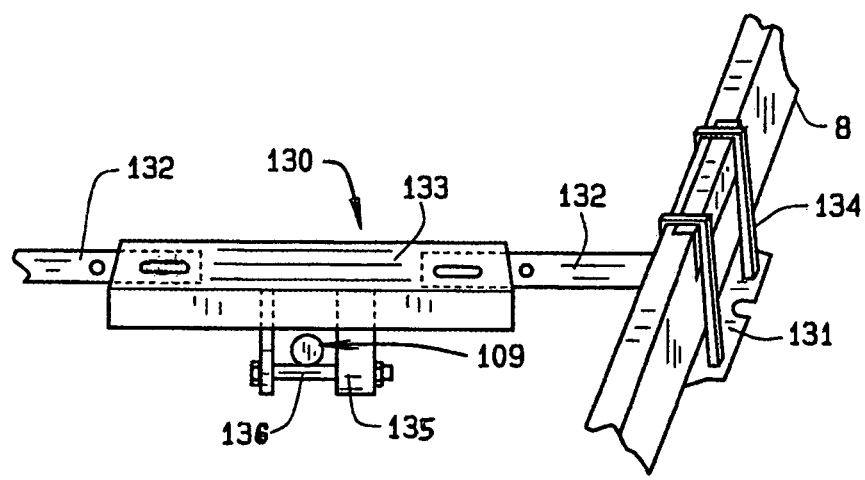
FIG. 9 is a partial perspective view of a first embodiment of a tube support assembly.
Figure 10:
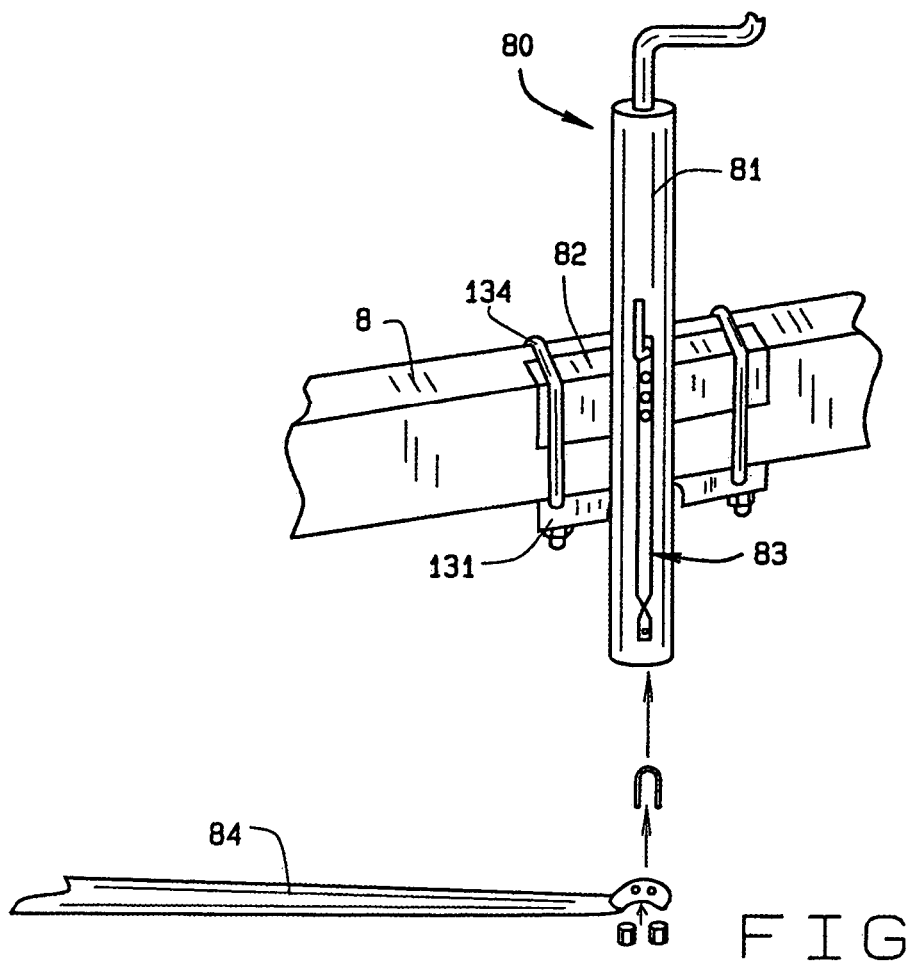
FIG. 10 is a partial perspective view of a first embodiment of a jack assembly.

As shown in FIGS. 7-9, the sway controlling or steering function of the hitch assembly 10 of the present invention is accomplished through a slide assembly 120, a tail support assembly 130, and converging links 140. The converging links 140 are similar to the ones disclosed in U.S. Pat. No. 4,722,542 and U.S. Pat. No. 5,660,409, hereby incorporated by reference. The slide assembly 120, tail support assembly 130, and converging links 140 effectively move the pivot axis for the hitch assembly 10 to near the rear axle of the tow vehicle 1. This projection of the pivot axis provides the hitch assembly 10 with good lateral stability with little or no tendency to sway or fishtail when buffeted by cross winds or when otherwise subjected to lateral forces. However, in the present design the converging links 140 do not carry any tongue weight and they do not transfer pulling or stopping forces, as described above.

The slide assembly 120 comprises guides 121, slide plates 122, crosslinks 126, and crosslink brackets 127. The guides 121 are plastic rectangular bars attached along the inside of the side channels 101 of the ball mount assembly 100 to act as bearing surfaces for supporting and guiding the slide plates 122. The slide plates 122 are rectangular plates with a cutout in a front end defining two link tabs 123 and corresponding holes 124 for attaching the converging links 140. The two slide plates 122 are welded together one on top of the other with evenly spaced spacers 125 so there is a gap between the plates 122 for receiving the guides 121. When assembled, the slide plates 122 reside within the side channels 101 of the ball mount assembly 100 so the slide plates 122 slide forward and backward along the guides 121. Located between the slide plates 122 is a pair of horizontal crosslinks 126 which are parallel to one another. One end of the crosslinks 126 is pivotally attached to one side of the slide plates 122 and runs crossways between the slide plates 122. The other end of the crosslinks 126 protrudes through corresponding openings cut out of one of the side channels 101. The protruding crosslink 126 ends are pivotally attached to a pair of crosslink brackets 127 which are welded to the outside face of the side channels 101.

As described above, the rear of the ball mount assembly 100 has an extended tail tube 109 that engages the tail support assembly 130. The tail support assembly comprises a U-bolt plate 131, a channel 133, and a tail bracket 135. The U-bolt plate 131 is a rectangular plate with an angled channel tab 132 extending laterally for supporting the channel 133. Each U-bolt plate 131 is clamped to the bottom of each trailer side member 8 using U-bolts 134 so the channel tabs 132 face inwardly and align parallel with each other. The channel 133 attaches between the channel tabs 132 so the channel 133 can be adjusted laterally for centering the tube support assembly 130 relative to the trailer 4. The tail bracket 135 attaches to the underside of the channel 133 and extends downward so a roller 136 is parallel with the channel 133.

When assembled, the tail tube 109 rests snuggly inside the tail bracket 135. Although the roller 136 allows the tail tube 109 to move forward and backward along the longitudinal axis of the ball mount assembly 100, the tail bracket 135 restricts any other lateral movement of the tail tube 109. The ability to move forward and backward accommodates any such motion created by the use of surge brakes. Since the trailer 4 is rigidly attached to the tail support assembly 130, the longitudinal axis of the trailer 4 remains parallel with the longitudinal axis of the tail support assembly 130 at all times.

The converging links 140 are straight links of equal length having spherical bearings 141 on each end for pivotally connecting the hitch box assembly 30 to the slide assembly 120. The front ends of the converging links 140 are pivotally attached to the back tabs 36 of the hitch box assembly 30 with link pins 142. The rear ends of the converging links 140 pivotally attach to the link tabs 123 of the slide assembly 120 with link pins 142. The spherical bearings 141 allow the converging links 140 to pivot in any direction to prevent any misalignment during turns, inclines, or declines.

When assembled, the converging links 140 are equidistant from the centerline M and converge forwardly. The convergence is such that the links 140, if extended forwardly, will intersect along a centerline M perhaps ahead of the rear of the tow vehicle 1, perhaps ahead of the rear wheels 6. When the trailer 4 is directly behind the tow vehicle 1, the links 140 are symmetrically positioned. When the trailer 4 shifts to one side or the other during turns, the convergence intersection transfers to points which are closer to the hitch box assembly 30 and offset from the centerline M. Together, the converging links 140 and slide assembly 120 effectively move the pivot axis for the hitch assembly 10 to near the rear axle of the tow vehicle 1.

The relative relationship of the elements of the hitch assembly 10 when the tow vehicle 1 and trailer 4 are negotiating turns are shown in FIGS. 8A, 8B, and 8C. As the tow vehicle 1 turns relative to the trailer 4, the hitch bar assembly 20 and hitch box assembly 30 necessarily move in the direction of hitch receiver 2 on the tow vehicle 1. The front support member 70 and strut assembly 90 pivot at the first pivot point 11. Simultaneously, the converging links 140 pivot to allow turning while maintaining the effective hitch pivot axis near the rear of the tow vehicle 1. As the individual links 140 pivot, the relative radius of the links 140 shorten drawing the slide assembly 120 forward towards the hitch box assembly 30 and the ball mount assembly 100 pivots at the second pivot point 12. As the tow vehicle 1 turns sharper, the ball mount assembly 100 will pivot at the second pivot point 12 until it rests nearly against the strut assembly 90. As mentioned above, the trailer 4 remains parallel with the longitudinal axis of the ball mount assembly 100 because the trailer 4 is rigidly attached to the ball mount assembly 100 and the tail support assembly 130. Since ball mount assembly 100 with the hitch ball 108 and trailer 4 attached thereto, are held in place at the second pivot point 12 by strut assembly 90, the trailer 4 remains a predetermined distance away from the tow vehicle 1 (e.g. the length of the strut assembly minus the length of the ball mount assembly plus a small change in the radius of ball mount assembly as it moves side-to-side). Therefore, braking of the tow vehicle even without the use of good trailer brakes doesn't allow pressure to be exerted on the converging links.

In this way the converging links 140 steer the trailer 4 and the sliding movement of the slide assembly 120 accommodates the change in radial movement of the converging links 140 during turns. However, neither the slide assembly 120 nor the converging links 140 carry any of the tongue weight as in previous designs. Instead, the tongue weight is carried on a hanging support assembly 150 to be described below in the weight carrying section. As a result, the present invention allows for more tongue weight without adding to the cost and weight by increasing the size of the converging links and all associated components as in previous designs. In addition, adjustable blocks are not needed to keep the side movement of the ball mount assembly 100 to near zero clearance. Instead, the present invention uses two parallel crosslinks 126 which eliminate the need for fine-tune or maintenance as in previous designs.

Load Bearing

Generally, the present invention can handle greater gross trailer loads than previous designs. In the present invention, this is accomplished by not carrying any tongue weight with the converging links 140, as mentioned above. Instead, the hanging support assembly 150 carries the tongue weight, which keeps the converging links 140 approximately level with the hitch assembly 10 at all times. In addition, spring bars 84 and the jack assembly 80 distribute the tongue weight among all the tow vehicle wheels 3 and all the trailer wheels 6. As a result, the present invention relates to Class III or heavier rated hitch systems.

The hanging support assembly 150 comprises a support frame 151 and a pair of vertical links 154. The support frame 151 is an arch-shaped frame including legs 152 that rigidly attach vertically to the front end of the strut assembly 90 and a crossbar 153 connecting the legs 152. The support frame 151 should be attached directly over the side supports 106 of the ball plate assembly 104 with the crossbar 153 parallel with the front support member 70. The vertical links 154 are straight links with spherical bearings 155 attached at each end for connecting the support frame 151 to the side channels 101 of the ball mount assembly 100. Top ends of the vertical links 154 pivotally connect to the crossbar 153 so the vertical links 154 hang parallel to each other. Bottom ends of the vertical links 154 pivotally connect to respective side channels 101. The spherical bearings 155 allow the ball mount assembly 100 to pivot during turning as described above. When assembled, the tongue weight placed on the ball mount assembly 100 by the trailer 4 is transferred to the hanging support assembly 150 via the vertical links 154. The hanging support assembly 150 transfers the weight through the strut assembly 90 and front support member 70 to the hitch box assembly 30 and hitch bar assembly 20, which are supported by the hitch receiver 2. As will be described below, the springs bars 84 and jack assembly 80 distribute the weight among all the tow vehicle wheels 3 and all the trailer wheels 6. As a result, the tongue weight is transferred to the tow vehicle 1 and the trailer 4 without placing any tongue weight on the converging links 140.

Figure 12:
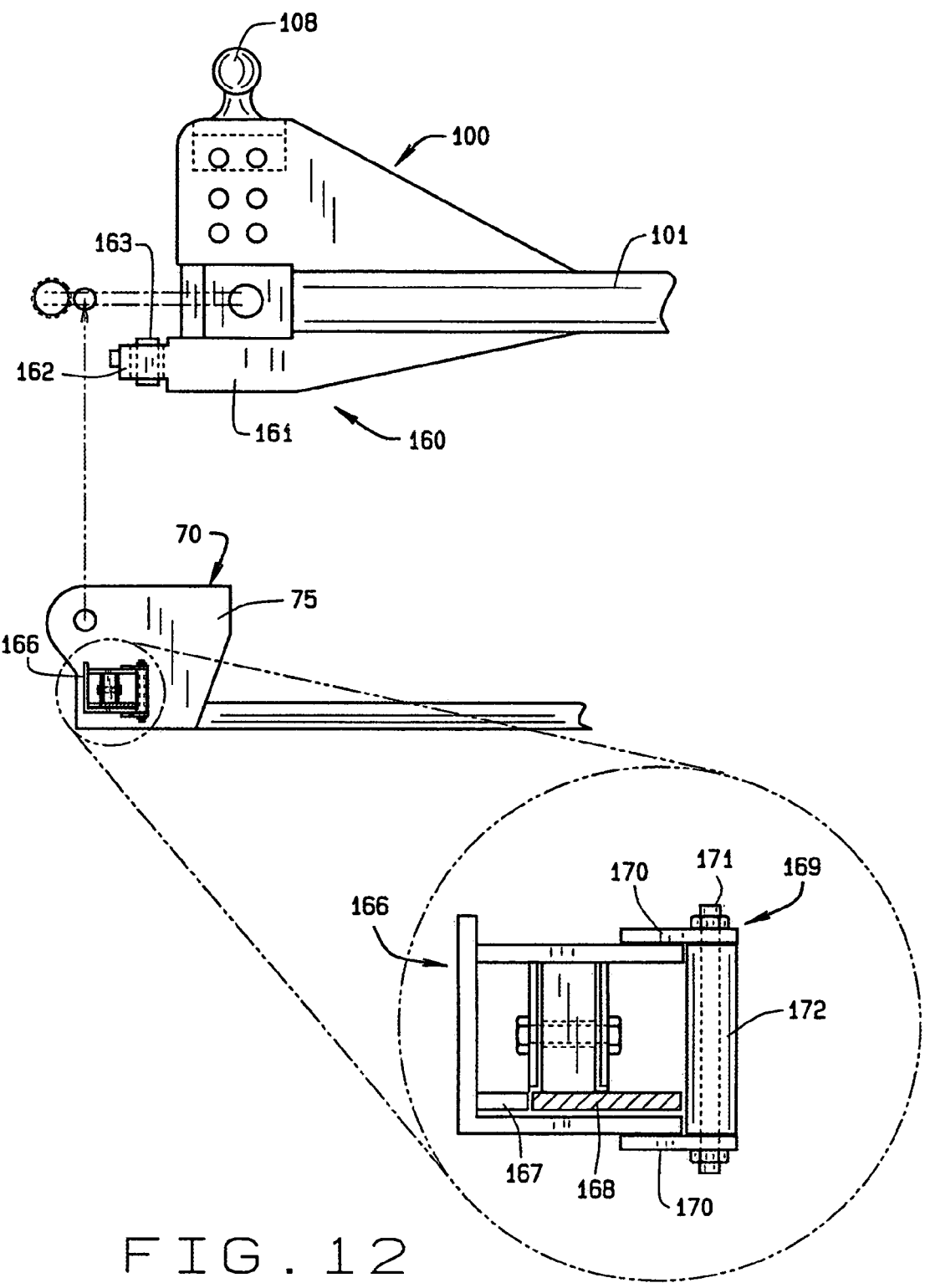
FIG. 12 is a side view of an alternate embodiment of the invention using a roller assembly.

Those skilled in the art will recognize that alternative embodiments may be used in place of the hanging support assembly 150 to carry the tongue weight. For example, FIG. 12 illustrates a roller assembly 160 for supporting the tongue weight on the hitch assembly 10. The roller assembly 160 comprises a pair of roller supports 161, a pair of rollers 163, a C-channel 166, and a channel support 169. Each roller support 161 is a flat plate that welds to the bottom of a respective side channel 101 of the ball mount assembly 100 so that roller tabs 162 extend forwardly. The rollers 163 pivotally attach to each roller tab 162 so they can engage the C-channel 166. The C-channel 166 is welded between the side tubes 91 of the strut assembly 90 with the opening of the C-channel 166 facing the rollers 163 for engagement. The C-channel 166 includes a spacer 167 and a wear plate 168 along an inner bottom surface. When assembled the rollers 163 fit inside the C-channel 166 so the rollers 163 can roll back and forth along either the wear plate 168 or the top inner surface of the C-channel 166. The channel support 169 attaches to the midsection of the C-channel 166 to provide additional support to the C-channel 166. The channel support 169 includes two tabs 170 that respectively attach to the top and bottom of the C-channel 166. A bolt 171 and spacer 172 connect the two tabs. During operation, tongue weight is transferred from the hitch ball 108 and ball mount assembly 100 through the roller assembly 160 to the front support member 70. As described above, the tongue weight then transfers from the front support member 70 to the hitch box assembly 30 and hitch bar assembly 20, which are supported by the hitch receiver 2. Finally, the springs bars 84 and jack assembly 80 distribute the weight among all the tow vehicle wheels 3 and all the trailer wheels 6. As a result, the tongue weight is transferred to the tow vehicle 1 and the trailer 4 without placing any tongue weight on the converging links 140.

As mentioned above, the spring bars 84 are inserted into the spring bar tubes 74 located on the front support member 70 extending rearwardly and horizontally at an outward angle so they can attach to the trailer frame 5 via the jack assembly 80. The outward angle positions the rear ends of the spring bars 84 into near alignment with the side members 8 of the trailer's A-frame. The spring bars 84 also slope downward toward the rear to allow for tensioning.

The jack assembly 80 comprises a pair of jacks 81, jack brackets 82, spring bar links 83, and the spring bars 84. The jack brackets 82 are L-shaped brackets secured to the top of the side members 8 of the trailer 4 by the same U-bolts 134 used to secure the U-bolt plates 131. However, the jack brackets can be secured by any other conventional means, such as welding or independent U-bolts. The jacks 81 are vertically welded to the jack brackets 82 so each jack 81 resides in a recess of the U-bolt plate 131. The spring bars 84 are attached to the jacks 81 with the spring bar links 83. The upper end of each spring bar link 83 is pivotally attached to each jack 81 and the lower end of the each link 83 is pivotally attached to each spring bar 84. Consequently, the jacks 81 can tension the spring bars 84 while still allowing pivotal movement during turns. The jacks 81 should be cranked until appropriate tension is applied to the spring bars 84. Spring bars have long been used in conjunction with trailer hitches to achieve better weight distribution among all the tow vehicle wheels and all the trailer wheels, and the principle will therefore not be described in more detail here.

Figure 13:
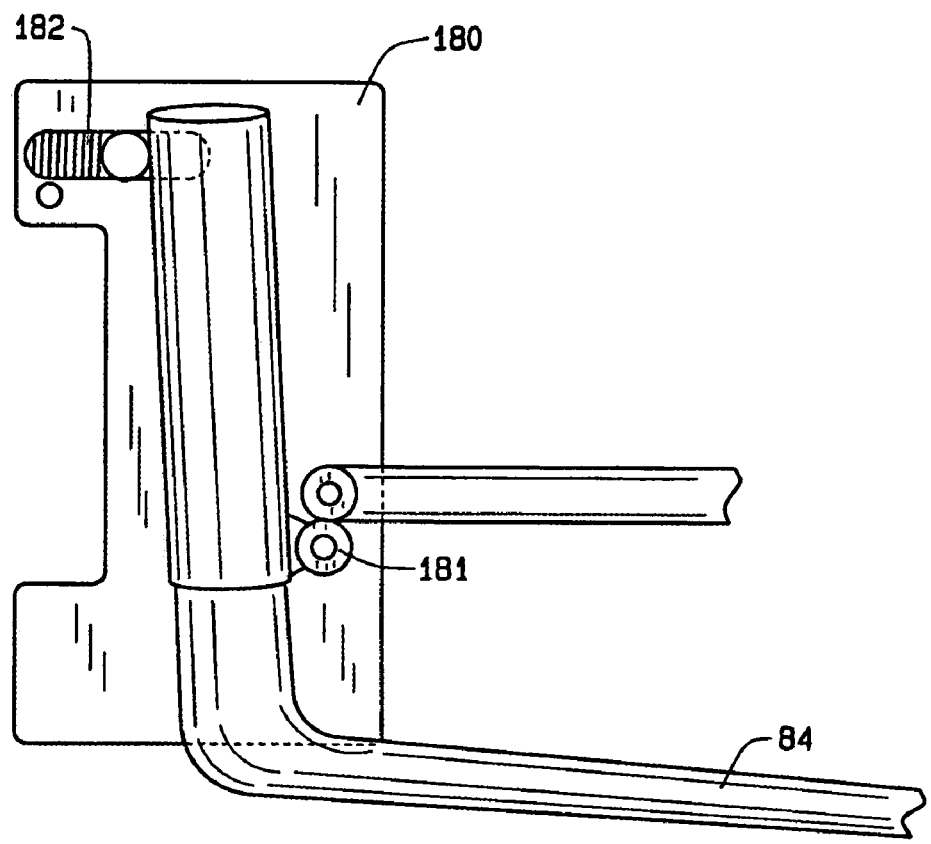
FIG. 13 is a top view of an alternate embodiment of a front support member and spring bar.
Figure 14:
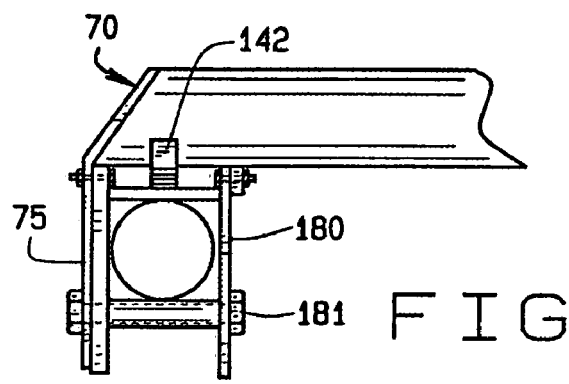
FIG. 14 is a side view of an alternate embodiment of the front support member and spring bar.

Changes can be made in the above constructions without departing from the scope of the invention, it is intended that all matter contained in the above description or shown in the accompanying drawings shall be interpreted as illustrative and not in a limiting sense. For example, the spring bars 84 and front support member 70 can be modified to accommodate different shapes and sizes of trailer frames. In one alternate embodiment shown in FIGS. 13 and 14, the front support member 70 includes inner plates 180 parallel to the side support plates 75. The plates 180 and 75 should be spaced appropriately for receiving the spring bars 84. In this alternate embodiment, the spring bars 84 are round L-shaped bars. The spring bars 84 are pivotally attached to bushings 181 located between the plates 180 and 75. Using an adjustable T and washers 182 attached to the plates 180 and 75, the spring bars 84 can pivot to accommodate different shape and sizes of trailer frames. It should be noted that in this alternate embodiment, the spring bar tubes 74 of the front support member 70 described above are not included.

Figure 15:
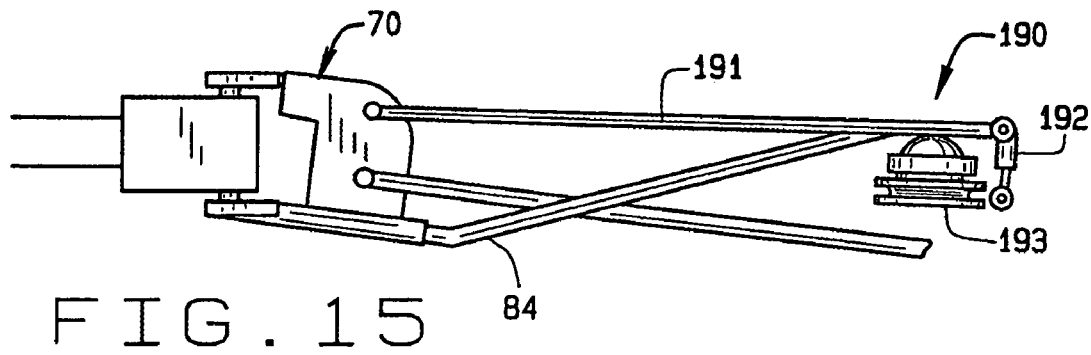
FIG. 15 is a side view of an alternate embodiment of the invention using an air bellows.
Figure 16:
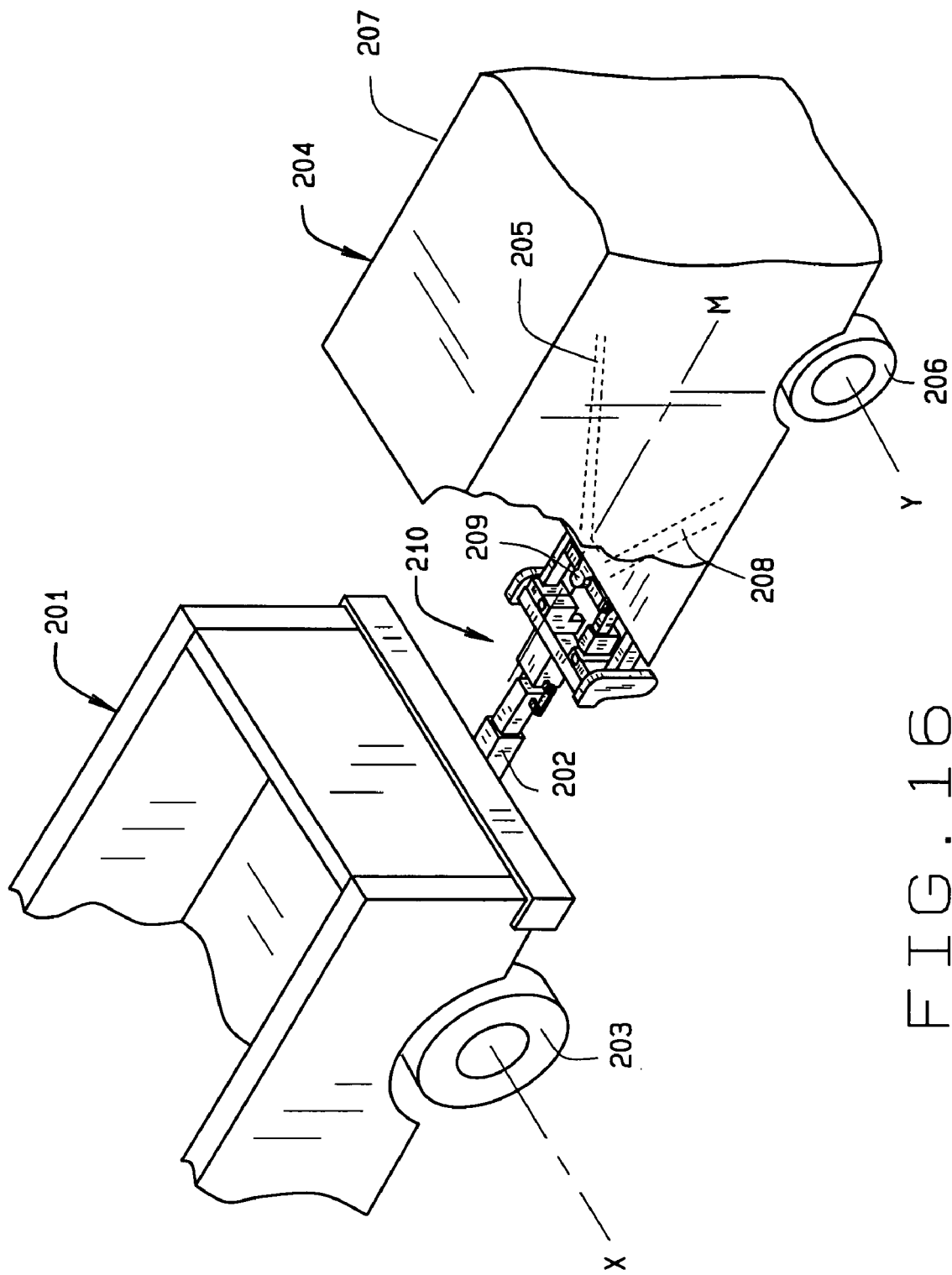
FIG. 16 is a perspective view of a second embodiment of a trailer connected to a tow vehicle with a hitch assembly.

In another alternate embodiment shown in FIG. 15, the jack assembly 80 is replaced with an air bellows assembly 190 for distributing the tongue weight among all the tow vehicle wheels 3 and all the trailer wheels 6. In this embodiment, the spring bars 84 attach to a bellows bracket 191. The bellows bracket 191 pivotally attaches between the front support member 70 and a shock absorber 192. The shock absorber pivotally attaches to the trailer frame 6. The bellows bracket 191 rests on an adjustable air bellows 193. In operation, the air bellows 193 adjusts similar to the jacks 81 of the first embodiment to equalize the tongue weight.

Second Embodiment of the Present Invention

As shown in the second embodiment of the present invention as shown in FIGS. 16-24, a tow vehicle 201 is coupled to a trailer 204 with a hitch assembly 210. It will be appreciated by those skilled in the art that the tow vehicle 201 can be any conventional automobile, a van, or truck such as the pickup shown in FIG. 16. Further, as used in the specification and the claims, the term trailer is intended to include any type of towable device or vehicle that can be pulled behind or trails a tow vehicle. The tow vehicle 201 includes rear wheels 203 which revolve about an axis X. The tow vehicle 201 includes a conventional hitch receiver 202, which is appropriately secured to the tow vehicle 201 in any conventional or accepted manner.

The trailer 204 has a frame 205 which is supported on wheels 206 that revolve about a common axis Y, and the frame 205 in turn supports a trailer body 207. The front of the frame 205 forms a so-called tongue or A-frame, in that it has side members 208 which converge forwardly and are connected at their forward ends to a coupler 209 used to secure the trailer 204 to a hitch ball 308 of the hitch assembly 210. The coupler 209 is a generally spherical socket that opens downwardly and is sized to receive a conventional trailer hitch ball 308. The coupler 209 also has a conventional locking device which will close upon the hitch ball and retain it in the socket. The coupler 209 may also contain a conventional surge brake. Generally, a surge brake contains a master cylinder that is hydraulically connected through lines to brakes at the wheels of the trailer 204. A conventional surge brake is actuated when the tow vehicle slows or stops and the forward movement of the trailer 204 urges the master cylinder against the hitch ball, which in turn, causes hydraulic actuation of the brakes at the trailer wheels. The hitch assembly 210 of the present invention can accommodate trailers employing conventional surge brakes as well as trailers employing more exotic braking mechanisms. A typical trailer also includes safety chains and an electric plug.

The present invention has three separate functions: 1) pulling and stopping, 2) sway controlling, and 3) load bearing. In order to better illustrate the three separate functions of the invention, the remaining description is divided into three separate sections with each section concentrating on one of the three functions of the invention.

Pulling and Stopping

As shown in FIGS. 16-21, for pulling and stopping the trailer 204 the hitch assembly 210 comprises a hitch bar assembly 220, a hitch box assembly 230, an over-center latch assembly 250, a spring bar housing 270, a strut assembly 290, and a ball mount assembly 300. Together, these assemblies connect the tow vehicle 201 to the trailer 204 for transferring the pulling and stopping forces of the tow vehicle 201 to the trailer 204. Notably, the pulling and stopping forces are not transferred through converging links 325, which will be described below in greater detail.

Figure 17:
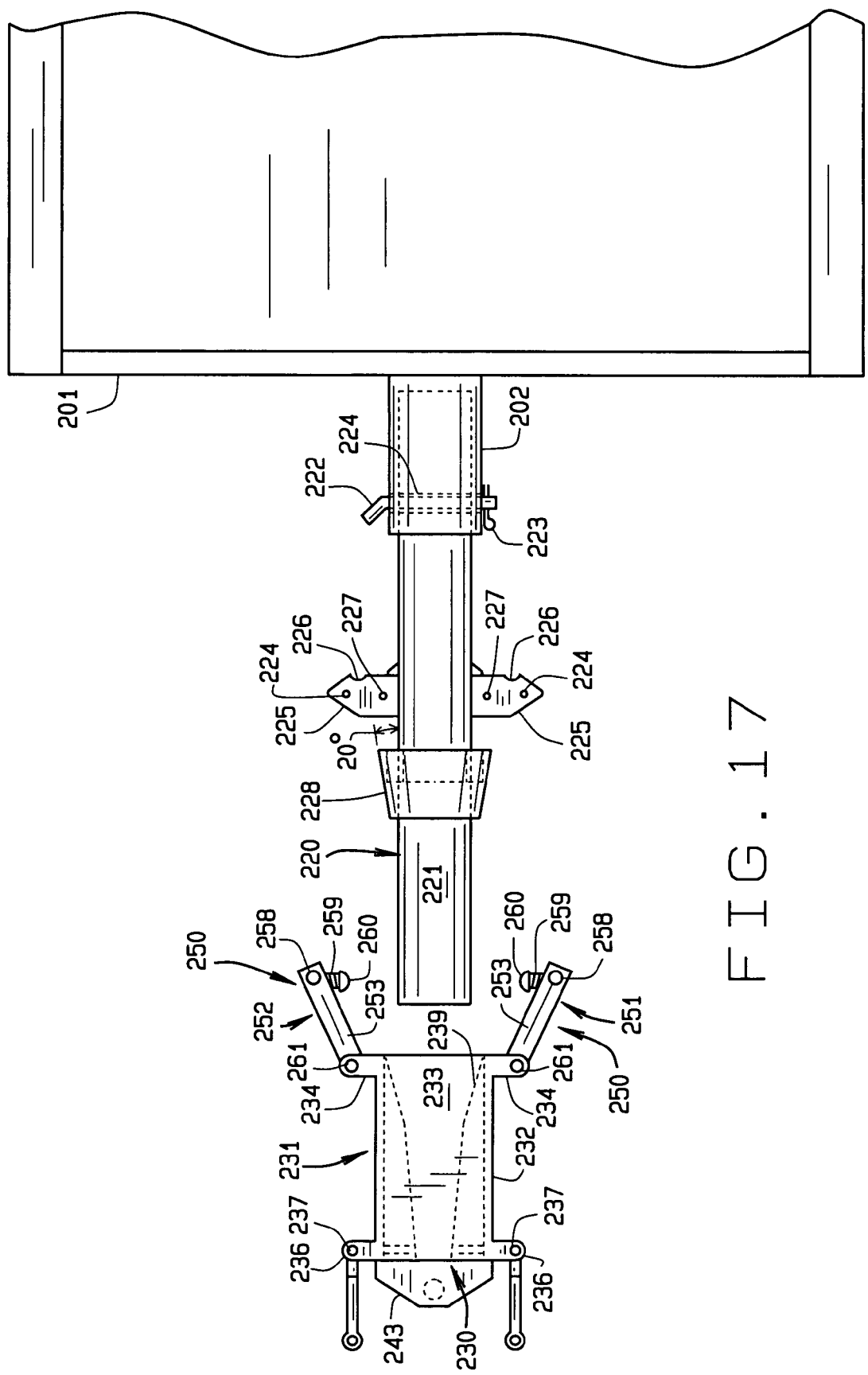
FIG. 17 is a top view of a second embodiment of a hitch bar and a hitch box assembly.

As shown in FIGS. 17 and 18, the hitch bar assembly 220 is a square bar 221 that inserts into the hitch receiver 202 and projects rearwardly in a generally horizontal orientation with its longitudinal axis along the centerline of the tow vehicle 201. The hitch bar assembly 220 fits snugly into the hitch receiver 202 with very little clearance and is secured by inserting a standard clip 222 and hitch pin 223 into corresponding through holes 224. The hitch bar assembly 220 includes over-center latch tabs 225 welded to each side of the bar 221 at the mid-section. The tabs 225 project laterally from the bar 221 and define through holes 224, concave recesses 226, and roll pins 227 for coupling with the over-center latch assembly 250 to be described below. The hitch bar assembly 220 also includes stops 228 welded to the rear of the tabs 225 on all four sides of the bar 221 for mating with the hitch box assembly 230 to be described below. The stops 228 are wedges with beveled faces facing rearwardly with an angle of about 20°.

The hitch box assembly 230 is similar to the one disclosed in first embodiment described above which mates with the hitch bar assembly 220. As shown in FIGS. 19A and 19B, the hitch box assembly 230 comprises an outer hitch box 231 and an inner hitch box 238. The outer hitch box 231 comprises four sidewalls 232 which are joined together to form a square box-like enclosure defining an opening 233 for receiving the inner box 238. To insure a tight fit, the inner dimensions of the outer hitch box 231 are sized to fit closely over the outer dimensions of the inner hitch box 238. The inner hitch box 238 comprises four angular walls 239 joined to form a funnel-shaped enclosure that narrows from a front end 240 to a back end 241 for receiving the hitch bar assembly 220. The interior dimensions of the angular walls 239 should provide enough clearance so the bar 221 of the hitch bar assembly 220 can extend to the rear of the hitch box 230 when inserted. In addition, the walls 239 are angled to match the beveled faces of the stops 228 of the hitch bar assembly 220 for proper seating.

The inner hitch box 238 is secured to the outer hitch box 231 by welding the front end 240 to the sidewalls 232 and welding two fillers 242 horizontally between the back end 241 and the sidewalls 232. The inner hitch box 238 is secured inside the outer hitch box 231 so the back end 241 is raised slightly higher than the front end 240 at approximately a five-degree angle. The back end 241 is raised higher to compensate for looseness and weakness in the hitch receiver 202 when spring bars 284 are tensioned. When the spring bars 284 are tensioned, the hitch receiver 202 may angle slightly downward. Therefore, the five-degree angle serves to keep the hitch box assembly 230 nearer to horizontally level.

The outer hitch box 231 also comprises four front tabs 234 for attaching the over-center latch assembly 250 and four back tabs 236 for attaching converging steering links 325, which are described below in the steering section. The front tabs 234 and back tabs 236 define respective through holes 235 and 237. The front tabs 234 are welded at the frontward sides of the outer hitch box 31 at the top and bottom projecting laterally so the through holes 235 align. The back tabs 236 are welded at the rearward sides of the outer hitch box 231 at the top and bottom projecting laterally so the through holes 237 align. The back tabs 236 should define a gap between themselves large enough to provide a narrow clearance for inserting the converging steering links 325.

As shown in FIGS. 17 and 18, the over-center latch assembly 250 is similar to the one disclosed in the first embodiment described above, which is used to secure the hitch box 230 to the hitch bar assembly 220. The over-center latch assembly 250 includes a left latch 251 and right latch 252 each comprising a pair of connecting links 253, a vertical tube 256, a pivot pin 257, a thrust link 259, a latch pin 261, and a safety pin 262. Each connecting link 253 is a straight bar defining front through holes and back through holes. The pair of connecting links 253 is connected in parallel by hingedly attaching the pivot pin 257 between the front holes and by fixedly attaching the hollow vertical tube 256 between the back holes. The pivot pin 257 defines a transversely directed threaded bore for receiving the thrust link 259 located midway between the two connecting links 253. The thrust link 259 is a threaded rod with a cross head 260 which inserts into the threaded bore of the pivot pin 257 so the surface of the cross head 260 is presented away from the pivot pin 257 for engaging the latch tabs 225 of the hitch bar assembly 220. The thrust link 259 can be screwed either in or out of the threaded bore to allow for any adjustment needed to ensure a tight fit with the latch tabs 225. To rotate the pivot pin 257 and thrust link 259 about a vertical axis, hexagonal heads 258 are attached to each end of the pivot pin 257. The hexagonal heads 258 can be engaged by a conventional end, socket or box wrench to rotate the pivot pin 257 and thrust link 259 to engage and disengage the hitch bar assembly 220. The left latch 251 and right latch 252 are attached to respective front tabs 234 of the hitch box 230 by inserting each latch 251 and 252 in between the top and bottom front tabs 234 so the vertical tubes 256 align with the through holes 235. To secure both latches 251 and 252, latch pins 261 are inserted through the front tabs 234 into the vertical tubes 256 so the latches 251 and 252 can rotate about a vertical axis. For additional security, the latch pins 261 are secured with cotter pins 263.

To secure the hitch bar assembly 220 to the hitch box assembly 230 the bar 221 of the hitch bar assembly 220 inserts into the hitch box assembly 230 until the stops 228 seat against the walls 239 of the inner hitch box 238. The latches 251 and 252 pivot from a slightly outward direction to a slightly inward position, referred to as the over-center position so the connecting links 253 rest against the roll pins 227 of the latch tabs 225. A conventional end, socket or box wrench engages the hexagonal heads 258 of the pivot pins 257 and rotates the pivot pins 257 and thrust links 259 so the cross heads 260 engage the recesses 226 of the latch tabs 225, also referred to as the over-center position. In this position, the hitch box assembly 230 is prevented from moving laterally or vertically with respect to the hitch bar assembly 220. The over-center latch assembly 250 prevents the hitch box assembly 230 from pulling away from the hitch bar assembly 220. For extra safety, the safety pins 262 are inserted into the through holes 224 of the latch tabs 225. The safety pins 262 prevent the latches 251 and 252 from moving outwardly away from the over-center position. Before anyone attempts to swing either latch 251 or 252 outwardly in order to disconnect the hitch box assembly 230, the safety pins 262 must be removed.

The hitch box assembly 230 also includes an extension 243 projecting laterally from the bottom rearward side of the outer hitch box 231 and a gusset 245 attached to the bottom of the outer hitch box 231. A king pin 244 extends downwardly from the extension 243 to pivotally connect to a spring bar housing 270 at a first pivot point 211.

Figure 21A:
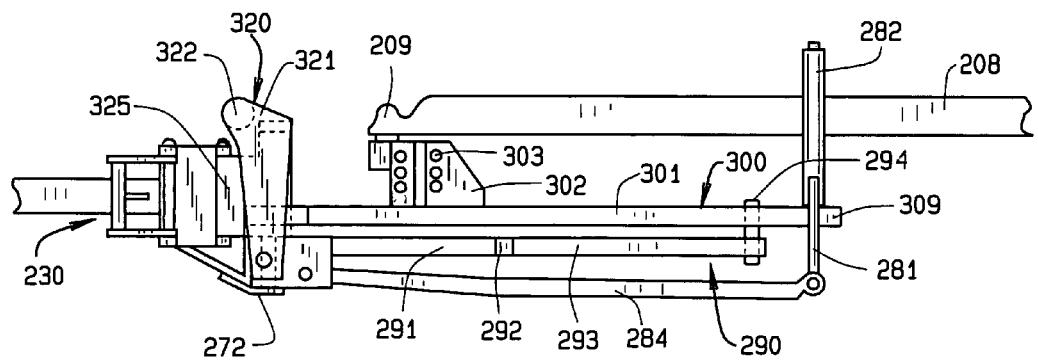
FIG. 21A is a partial side view of the second embodiment of the hitch assembly.
Figure 21B:
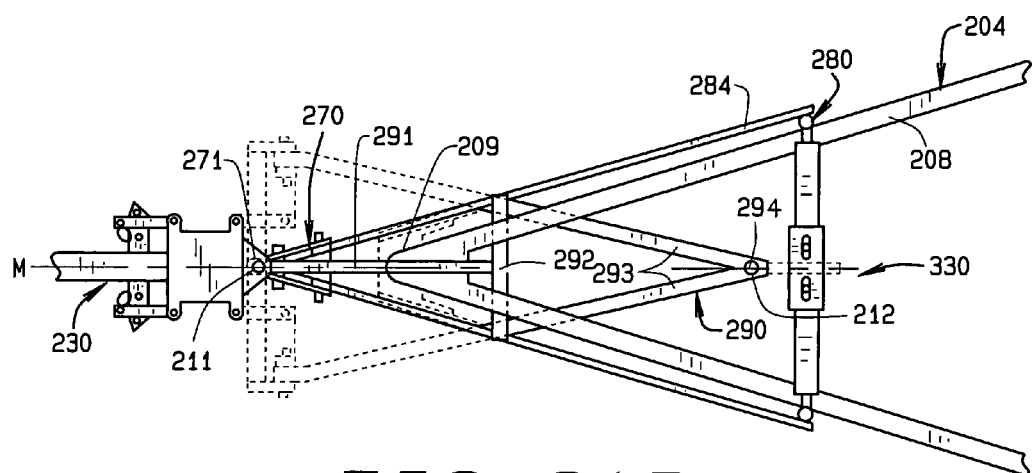
FIG. 21B is a partial top view of the second embodiment of the hitch assembly.

As shown in FIGS. 21A and 21B, the spring bar housing 270 is a V-shaped box terminating in a bearing 271 that pivotally connects to the king pin 244. To assemble, the bearing 271 of the spring bar housing 270 slides over the king pin 244 and an angled plate 272 attaches to the gusset 245 to hold the housing 270 in place so that the housing 270 pivots laterally about the king pin 244. The spring bar housing 270 pivotally connects to the strut assembly 290 for transferring pulling and stopping forces to the ball mount assembly 300.

The strut assembly 290 is a frame having a main strut 291 pivotally connected to the spring bar housing 270 so that the main strut 291 and entire strut assembly 290 can pivot vertically. Vertical pivoting of the strut assembly 290 through the main strut 291 accommodates uneven roads or drives in which the front of the tow vehicle 201 is higher or lower than the rear of the tow vehicle 201. The main strut 291 extends rearwardly and horizontally to connect to a cross strut 292. Side struts 293 connect to each end of the cross strut 292 and extend rearwardly and angling inwards until intersecting at a second pivot point 212, thereby forming a V-shape. A ball mount pin 294 extends upward from the intersection of the side struts 293 to pivotally connect to the ball mount assembly 300 at a second pivot point 212.

As shown in FIGS. 20A-22B the ball mount assembly 300 is a V-shaped frame that pivotally connects the strut assembly 290 to the trailer 204 for transferring pulling and stopping forces. The ball mount assembly 300 comprises a front support member 320, side members 301, vertical supports 302, a ball plate assembly 304, and a tail tube 309.

The front support member 320 comprises vertical links 321 connected by a crossbar 322. Caps 323 attach to the crossbar 322 for pivotally connecting to converging links 325, which are described in further detail in the swaying control section and load bearing section.

The two side members 301 are rectangular tubes with front ends that pivotally connect to the vertical links 321 of the front support member 320 so that the side members 301 can pivot vertically but are rigid laterally. Vertical pivoting of the ball mount assembly 300 through the side members 301 accommodates uneven roads or drives in which the front of the tow vehicle 201 would be higher or lower than the rear of the tow vehicle 201. The side members 301 extend rearwardly and angle inwards until intersecting at a second pivot point 212, thereby forming a V-shape that mirrors the shape of the strut assembly 290. A hole at the intersection of the side members 301 pivotally connects to the ball mount pin 294.

The vertical supports 302 are rectangular plates defining a plurality of through holes 303 for attaching the ball plate assembly 304 at multiple heights. The vertical supports 302 are welded vertically to the top front ends of the side members 301.

As shown in FIGS. 20A and 20B, the ball plate assembly 304 is a horizontal crossbar 305 with side supports 306 welded to each end of the crossbar 305 extending downward and a hitch ball 308 mounted to the top center of the crossbar 305. The side supports 306 define through holes 307 for attaching to the vertical supports 302 of the ball mount assembly 300. The tail tube 309 is a straight tube welded to the rear end of the side members 301 so the tail tube 309 extends rearwardly and horizontally for engaging a tail support assembly 330 to be described below in greater detail.

To assemble, the ball plate assembly 304 is bolted to the vertical supports 302 at an appropriate height by aligning holes 307 of the ball plate assembly 304 with the appropriate holes 303 of the vertical support 302 and inserting bolts 310. The entire ball mount assembly 300 is pivotally attached to the ball mount pin 294 of the strut assembly 290 at the second pivot point 212 by inserting the ball mount pin 294 through a hole at the intersection of the side members 301. This pivoting connection allows the ball mount assembly 300 to pivot laterally above the strut assembly 290. In addition, the tail tube 309 couples with the tail support assembly 330 to be described below in greater detail in the sway controlling section. To complete the assembly, the trailer 204 attaches to the ball mount assembly 300 by coupling the hitch ball 308 with the coupler 209. Ordinarily, the typical ball-and-socket trailer hitch accommodates universal movement, but in the present invention, the trailer 204 is prevented from turning relative to the hitch ball 308 by the ball mount assembly 300 and the tail support assembly 330. Instead, this movement is accommodated by the converging links 325 described below in the steering section. However, the trailer 204 is free to rock from side-to-side on the hitch ball 308 in reference to the tow vehicle 201 and the rear of the ball mount assembly 300 where the tail tube 309 slides into the tail support assembly 330.

In operation, the pulling and stopping forces are transferred from the tow vehicle 201 through the hitch receiver 202 to the hitch bar assembly 220, from the hitch bar assembly 220 to the hitch box assembly 230, from the hitch box assembly 230 to the strut assembly 290, from the strut assembly 290 to the ball mount assembly 300, and finally, from the ball mount assembly 300 to the trailer 204. As mentioned above, none of the pulling and stopping forces are transferred through the converging links 325.

Sway Controlling

As shown in FIGS. 7-9, the sway controlling or steering function of the hitch assembly 210 of the present invention is accomplished through converging links 325 and a tail support assembly 330. The converging links 325 are similar to the ones disclosed in U.S. Pat. No. 4,722,542 and U.S. Pat. No. 5,660,409, hereby incorporated by reference. During operation, the converging links 325 effectively move the pivot axis for the hitch assembly 210 to near the rear axle of the tow vehicle 201. This projection of the pivot axis provides the hitch assembly 210 with good lateral stability with little or no tendency to sway or fishtail when buffeted by cross winds or when otherwise subjected to lateral forces.

As described above, the rear of the ball mount assembly 300 has an extended tail tube 309 that engages the tail support assembly 330. The tail support assembly comprises a U-bolt plate 331, a channel 333, and a tail bracket 335. The U-bolt plate 331 is a rectangular plate with an angled channel tab 332 extending laterally for supporting the channel 333. Each U-bolt plate 331 is clamped to the bottom of each trailer side member 208 using U-bolts 334 so the channel tabs 332 face inwardly and align parallel with each other. The channel 333 attaches between the channel tabs 332 so the channel 333 can be adjusted laterally for centering the tube support assembly 330 relative to the trailer 204. The tail bracket 335 attaches to the underside of the channel 333 and extends downward so a roller 336 is parallel with the channel 333.

When assembled, the tail tube 309 rests snuggly inside the tail bracket 335. Although the roller 336 allows the tail tube 309 to move forward and backward along the longitudinal axis of the ball mount assembly 300, the tail bracket 335 restricts any other lateral movement of the tail tube 309. The ability to move forward and backward accommodates any such motion created by the use of surge brakes. Since the trailer 204 is rigidly attached to the tail support assembly 330, the longitudinal axis of the trailer 204 remains parallel with the longitudinal axis of the tail support assembly 330 at all times.

The converging links 325 are vertical plates of equal length having bearings 326, such as needle bearings or tapered roller bearings, at the front ends for pivotally attaching to the hitch box assembly 230 and ball joints 327, such as spherical bearings or any bearing combination that allows for vertical and horizontal movement, on the rear ends for pivotally connecting to the caps 323 of the front support member 320. The front ends of the converging links 325 are pivotally attached to the back tabs 236 of the hitch box assembly 230 with link pins 328. The ball joints 327 allow the front support member 320 to pivot in any direction to prevent any misalignment during turns, inclines, or declines. As will be described below in the load bearing section, the vertical shape of the converging links 325 allows the links to carry larger tongue weights without increasing the size of the bearings 326, ball joints 327, or other associated components.

When assembled, the converging links 325 are equidistant from the centerline M and converge forwardly. The convergence is such that the links 325, if extended forwardly, will intersect along a centerline M perhaps ahead of the rear of the tow vehicle 201, perhaps ahead of the rear wheels 206. When the trailer 204 is directly behind the tow vehicle 201, the links 325 are symmetrically positioned. When the trailer 204 shifts to one side or the other during turns, the convergence intersection transfers to points which are closer to the hitch box assembly 230 and offset from the centerline M. The converging links 325 effectively move the pivot axis for the hitch assembly 210 to near the rear axle of the tow vehicle 201.

Figure 22A:
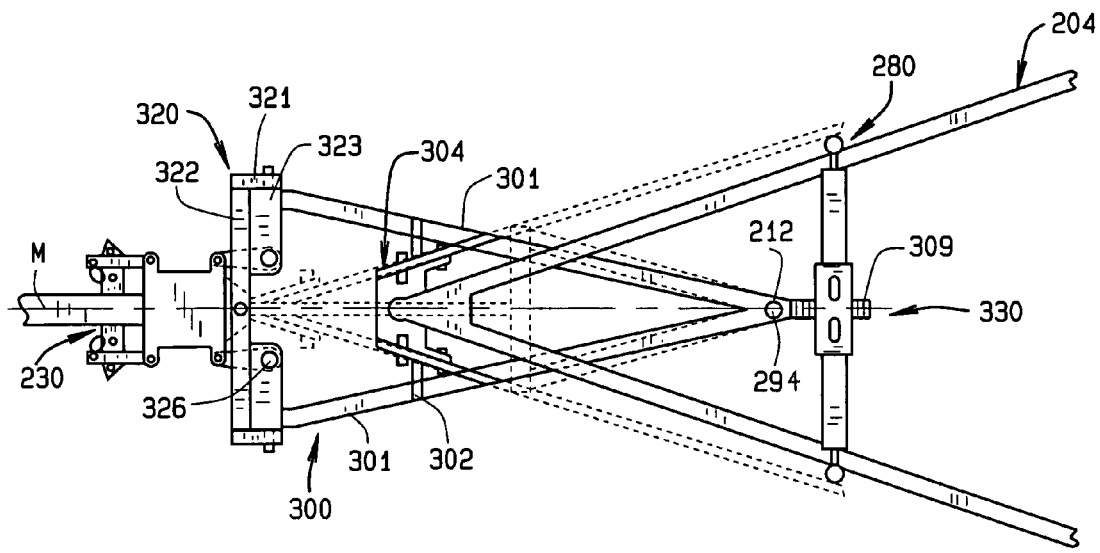
FIG. 22A is a partial top view of the second embodiment of the hitch assembly during straight travel.
Figure 22B:
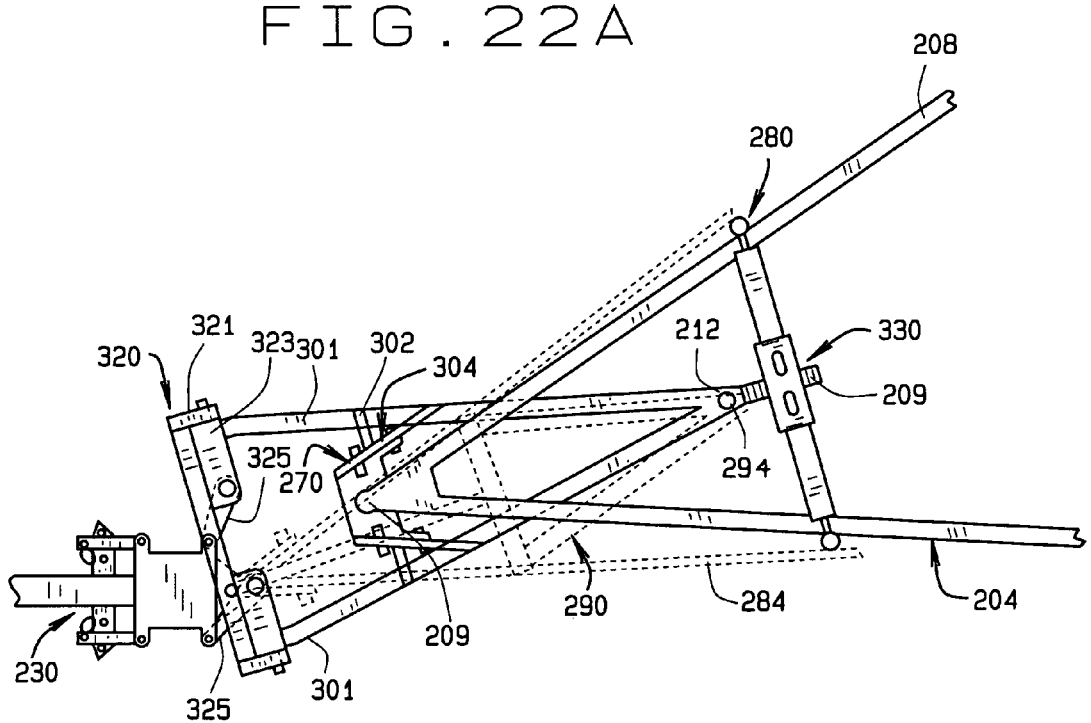
FIG. 22B is a partial top view of the second embodiment of the hitch assembly during a turn.
Figure 23:
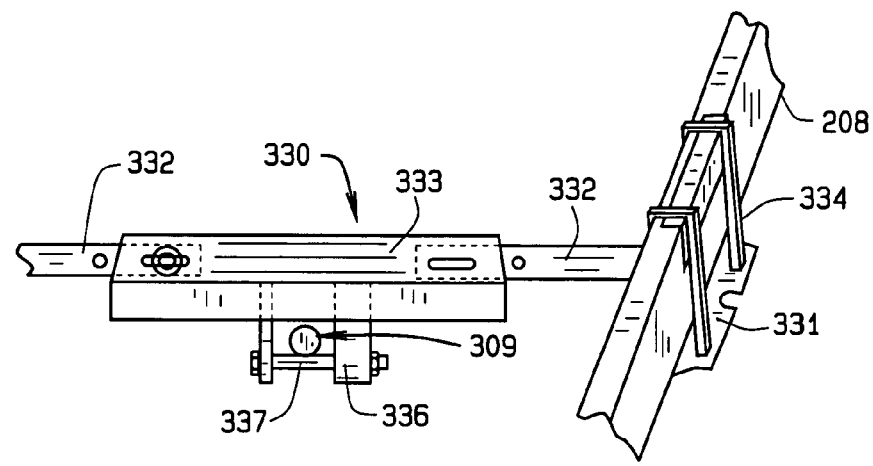
FIG. 23 is a partial perspective view of a second embodiment of a tube support assembly.
Figure 24:
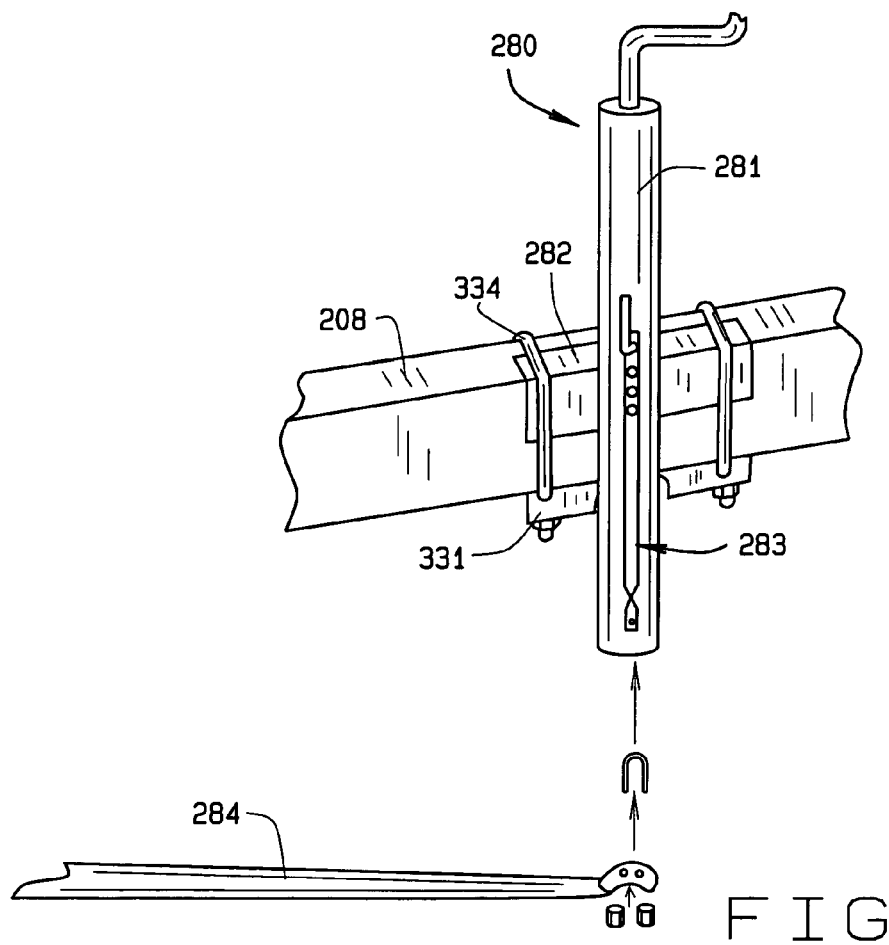
FIG. 24 is a partial perspective view of a second embodiment of a jack assembly.

The relative relationship of the elements of the hitch assembly 210 when the tow vehicle 201 and trailer 204 are negotiating turns are shown in FIGS. 22A and 22B. As the tow vehicle 201 turns relative to the trailer 204, the hitch bar assembly 220 and hitch box assembly 230 necessarily move in the direction of hitch receiver 202 on the tow vehicle 201. The spring bar housing 270 and strut assembly 290 pivot at the first pivot point 211. Simultaneously, the converging links 325 pivot to allow turning while maintaining the effective hitch pivot axis near the rear of the tow vehicle 201. As the individual links 325 pivot, the relative radius of the links 325 shorten drawing the front support member 320 forward towards the hitch box assembly 230 and the ball mount assembly 300 pivots at the second pivot point 212.

As mentioned above, the trailer 204 remains parallel with the longitudinal axis of the ball mount assembly 300 during turns because the trailer 204 is rigidly attached to the ball mount assembly 300 and the tail support assembly 330. Since the ball mount assembly 300 with the hitch ball 308 and trailer 204 attached thereto, are held in place at the second pivot point 212 by strut assembly 290, the trailer 204 remains a predetermined distance away from the tow vehicle 201 (e.g. the length of the strut assembly minus the length of the ball mount assembly plus a small change in the radius of ball mount assembly as it moves side-to-side). Therefore, braking of the tow vehicle even without the use of good trailer brakes doesn't allow pulling and stopping forces to be exerted on the converging links.

In this way the converging links 325 steer the trailer 204 and accommodate the change in radial movement of the converging links 325 during turns.

Load Bearing

Generally, the present invention can handle greater gross trailer loads than previous designs. As mentioned above, the converging links 325 are shaped as vertical plates allowing the links 325 to carry larger tongue weights without increasing the size of the bearings 326, ball joints 327, or other associated components. While the converging links 325 of the second embodiment do carry tongue weight, they do not transfer pulling or stopping forces, as described above.

In previous designs, the converging links are straight links or bars that connect to the hitch box assembly over a narrow area. When tongue weight is placed on a converging link of this type, the link acts as a lever arm placing large forces on the narrow area connecting the link to the hitch box assembly. In the second embodiment described herein, the design of the converging links 325 as a vertical plate effectively functions as a straight link with a supporting gusset. This design allows the tongue weight to be distributed over a broad area connecting the converging links 325 and the hitch box assembly 230. Specifically shown in FIG. 18, the tongue weight is distributed over the entire length of the connection between the converging link 325 and the hitch box assembly 230. This distribution of tongue weight allows the converging links 325 to carry larger tongue weight without increasing the size of the bearings 326, ball joints 327, and other associated components, thereby reducing manufacturing costs. Those skilled in the art will recognize that other shapes and designs of the converging links can be used, such as a straight link with a gusset.

In addition to the converging links 325, spring bars 284 and the jack assembly 280 distribute the tongue weight among all the tow vehicle wheels 203 and all the trailer wheels 206. As a result, the present invention relates to Class III or heavier rated hitch systems.

The spring bars 284 are attached to the spring bar housing 270 and extend rearwardly at an outward angle to pivotally attach to the trailer frame 205 via the jack assembly 280. When assembled, the spring bar housing 270 provides a stable pivoting connection between the hitch box assembly 230, the strut assembly 290, and the spring bars 284 at the first pivot point 211. The outward angle positions the rear ends of the spring bars 284 into near alignment with the side members 208 of the trailer's A-frame. The spring bars 284 also slope downward toward the rear to allow for tensioning.

The jack assembly 280 comprises a pair of jacks 281, jack brackets 282, spring bar links 283, and the spring bars 284. The jack brackets 282 are L-shaped brackets secured to the top of the side members 208 of the trailer 204 by the same U-bolts 334 used to secure the U-bolt plates 331. However, the jack brackets can be secured by any other conventional means, such as welding or independent U-bolts. The jacks 281 are vertically welded to the jack brackets 282 so each jack 281 resides in a recess of the U-bolt plate 331. The spring bars 284 are attached to the jacks 281 with the spring bar links 283. The upper end of each spring bar link 283 is pivotally attached to each jack 281 and the lower end of the each link 283 is pivotally attached to each spring bar 284. Consequently, the jacks 281 can tension the spring bars 284 while still allowing pivotal movement during turns. The jacks 281 should be cranked until appropriate tension is applied to the spring bars 284. Spring bars have long been used in conjunction with trailer hitches to achieve better weight distribution among all the tow vehicle wheels and all the trailer wheels, and the principle will therefore not be described in more detail here.

As a result, the second embodiment allows for more tongue weight without adding to the cost and weight by increasing the size of bearings, ball joints, and all associated components as in previous designs.

Changes can be made in the above constructions without departing from the scope of the invention, it is intended that all matter contained in the above description or shown in the accompanying drawings shall be interpreted as illustrative and not in a limiting sense.

The invention claimed is:

1. A hitch assembly comprising:
   a first pivot element coupled with a tow vehicle, having a first pivot point;
   a second pivot element coupled with the first pivot element at the first pivot point;
   a third pivot element coupled with the second pivot element at a second pivot point, the third pivot element removably coupled with a trailer;
   converging links connected between the first pivot element and the third pivot element, whereby the angular position between the first pivot point and the third pivot element can be varied, the converging links effectively moving the pivot point between the tow vehicle and trailer forward of the hitch assembly;
   a spring bar housing pivotally connected to the first pivot element for transferring pulling and stopping forces to and from the first pivot element; and
   a strut assembly connected to the spring bar housing for transferring pulling and stopping forces to and from the spring bar housing, the strut assembly having a second pivot point.

2. The hitch assembly of claim 1 wherein the first pivot element comprises:
   a hitch bar assembly coupled with the tow vehicle for transferring pulling and stopping forces to and from the tow vehicle;
   a hitch box assembly coupled with the hitch bar assembly for transferring pulling and stopping forces to and from the hitch bar assembly, the hitch box assembly having a first pivot point.

3. The hitch assembly of claim 2 wherein the hitch box assembly comprises:
   an overcenter latch assembly securing the hitch box assembly to the hitch bar assembly;
   an outer hitch box defining an opening, front tabs for connecting to the overcenter latch assembly, back tabs for pivotally connecting to the converging links, and an extension for pivotally connecting to the second pivot element;
   an inner hitch box attached within the opening of the outer hitch box including angular walls for seating with the hitch bar assembly.

4. The hitch assembly of claim 1 wherein the third pivot element comprises:
   a front support member pivotally connected to the converging links;
   a ball mount assembly connected to the front support member for transferring pulling and stopping forces to and from the second pivot assembly, wherein the ball mount assembly laterally pivots about the second pivot point during turns; and
   a ball plate assembly connected to the ball mount assembly for transferring pulling and stopping forces to and from the ball mount assembly which includes a hitch ball for removable attachment of a trailer for transferring pulling and stopping forces to and from the trailer.

5. The hitch assembly of claim 1 further comprising:
   a tail support assembly attached to a trailer frame and coupled with the third pivot element whereby the tail support assembly restricts lateral movement of the third pivot element so the trailer remains relative to the third pivot element at all times.

6. The hitch assembly of claim 1 further comprising:
   a jack assembly connected between a trailer frame and the second pivot element for distributing tongue weight among tow vehicle wheels and trailer wheels.

7. The hitch assembly of claim 1 wherein the strut assembly comprises:
   a main strut connected to the spring bar housing;
   a cross strut connected to the main strut;
   side struts connected to the cross strut and extending to intersection at the second pivot point for pivotally connecting to the third pivot element.

8. The hitch assembly of claim 4 wherein the ball mount assembly comprises:
   side members connected to the front support member and extending until intersection at the second pivot point for pivotally connecting to the second pivot element;
   vertical supports attached to the side members for removable attachment of the ball plate assembly in at least two positions for vertical adjustment.

9. The hitch assembly of claim 4 wherein the ball plate assembly comprises:
   a crossbar for supporting the hitch ball;
   at least one side support attached to each end of the crossbar, wherein the side supports removably attach to the ball mount assembly in at least two positions for vertical adjustment.

10. The hitch assembly of claim 4 wherein the front support member comprises:
    a crossbar including caps for pivotally connected to the converging links;
    vertical links connected to the crossbar and connected to the ball mount assembly.

* * * * *